(12) United States Patent
Livshiz et al.

(10) Patent No.: US 9,963,150 B2
(45) Date of Patent: May 8, 2018

(54) PROPULSION SYSTEM CONTROL WITH MPC

(71) Applicant: GM GLOBAL TECHNOLOGY OPERATIONS LLC, Detroit, MI (US)

(72) Inventors: Michael Livshiz, Ann Arbor, MI (US); Christopher E Whitney, Commerce, MI (US); Kevin C Wong, Canton, MI (US); Daniele Bernardini, Milan (IT); Alberto Bemporad, Lucca (IT)

( * ) Notice: Subject to any disclaimer, the term of this patent is extended or adjusted under 35 U.S.C. 154(b) by 0 days. days.

(21) Appl. No.: 15/426,306

(22) Filed: Feb. 7, 2017

(65) Prior Publication Data

US 2017/0361842 A1    Dec. 21, 2017

Related U.S. Application Data

(63) Continuation of application No. 15/184,706, filed on Jun. 16, 2016, now Pat. No. 9,789,876.

(51) Int. Cl.

| | | |
|---|---|---|
| *B60W 10/06* | (2006.01) | |
| *B60W 30/188* | (2012.01) | |
| *B60W 10/11* | (2012.01) | |
| *B60W 10/16* | (2012.01) | |

(52) U.S. Cl.
CPC .......... *B60W 30/188* (2013.01); *B60W 10/06* (2013.01); *B60W 10/11* (2013.01);
(Continued)

(58) Field of Classification Search
None
See application file for complete search history.

(56) References Cited

U.S. PATENT DOCUMENTS

| | | |
|---|---|---|
| 4,161,929 A | 7/1979 | Nohira et al. |
| 5,101,786 A | 4/1992 | Kamio et al. |

(Continued)

FOREIGN PATENT DOCUMENTS

| | | |
|---|---|---|
| CN | 1594846 A | 3/2005 |
| WO | 2003065135 A1 | 8/2003 |

OTHER PUBLICATIONS

U.S. Application filed Nov. 3, 2015; U.S. Appl. No. 14/931,134, Applicant: GM Global Technology Operations LLC; Title: System and Method for Adjusting Weighting Values Assigned to Errors in Target Actuator Values of an Engine When Controlling the Engine Using Model Predictive Control.
(Continued)

*Primary Examiner* — Dirk Wright

(57) ABSTRACT

A propulsion system, control system, and method are provided for optimizing fuel economy, which use model predictive control systems to generate first and second predicted actual axle torques and first and second predicted actual fuel consumption rates based on first and second sets of possible command values, respectively. The sets of possible command values include commanded engine output torques and commanded transmission ratios. First and second costs are determined for the first and second sets of possible command values, respectively, based on a first predetermined weighting value, a second predetermined weighting value, the first and second predicted actual axle torques, respectively, the first and second predicted actual fuel consumption rates, respectively, an axle torque requested, an engine output torque requested, a transmission ratio requested, and a fuel consumption rate requested. One of the first and second sets of possible command values is selected and set based on the lower cost.

20 Claims, 6 Drawing Sheets

(52) U.S. Cl.
CPC ..... *B60W 10/16* (2013.01); *B60W 2510/0619* (2013.01); *B60W 2510/0638* (2013.01); *B60W 2520/10* (2013.01); *B60W 2540/10* (2013.01); *B60W 2710/0666* (2013.01); *B60W 2710/1005* (2013.01)

(56) References Cited

U.S. PATENT DOCUMENTS

| | | |
|---|---|---|
| 5,706,780 A | 1/1998 | Shirakawa |
| 5,727,528 A | 3/1998 | Hori et al. |
| 5,775,293 A | 7/1998 | Kresse |
| 5,921,219 A | 7/1999 | Frohlich et al. |
| 6,014,955 A | 1/2000 | Hosotani et al. |
| 6,155,230 A | 12/2000 | Iwano et al. |
| 6,173,226 B1 | 1/2001 | Yoshida |
| 6,532,935 B2 | 3/2003 | Ganser et al. |
| 6,606,981 B2 | 8/2003 | Itoyama |
| 6,704,638 B2 | 3/2004 | Livshiz et al. |
| 6,826,904 B2 | 12/2004 | Miura |
| 6,840,215 B1 | 1/2005 | Livshiz et al. |
| 7,016,779 B2 | 3/2006 | Bowyer |
| 7,021,282 B1 | 4/2006 | Livshiz et al. |
| 7,051,058 B2 | 5/2006 | Wagner et al. |
| 7,222,012 B2 | 5/2007 | Simon, Jr. |
| 7,274,986 B1 | 9/2007 | Petridis et al. |
| 7,395,147 B2 | 7/2008 | Livshiz et al. |
| 7,400,967 B2 | 7/2008 | Ueno et al. |
| 7,433,775 B2 | 10/2008 | Livshiz et al. |
| 7,441,544 B2 | 10/2008 | Hagari |
| 7,563,194 B2 | 7/2009 | Murray |
| 7,614,384 B2 | 11/2009 | Livshiz et al. |
| 7,698,048 B2 | 4/2010 | Jung |
| 7,703,439 B2 | 4/2010 | Russell et al. |
| 7,715,975 B2 | 5/2010 | Yamaoka et al. |
| 7,775,195 B2 | 8/2010 | Schondorf et al. |
| 7,813,869 B2 | 10/2010 | Grichnik et al. |
| 7,885,756 B2 | 2/2011 | Livshiz et al. |
| 7,941,260 B2 | 5/2011 | Lee et al. |
| 7,967,720 B2 | 6/2011 | Martin et al. |
| 8,041,487 B2 | 10/2011 | Worthing et al. |
| 8,050,841 B2 | 11/2011 | Costin et al. |
| 8,073,610 B2 | 12/2011 | Heap et al. |
| 8,078,371 B2 | 12/2011 | Cawthorne |
| 8,103,425 B2 | 1/2012 | Choi et al. |
| 8,103,428 B2 | 1/2012 | Russ et al. |
| 8,116,954 B2 | 2/2012 | Livshiz et al. |
| 8,121,763 B2 | 2/2012 | Hou |
| 8,176,735 B2 | 5/2012 | Komatsu |
| 8,219,304 B2 | 7/2012 | Soma |
| 8,307,814 B2 | 11/2012 | Leroy et al. |
| 8,447,492 B2 | 5/2013 | Watanabe et al. |
| 8,468,821 B2 | 6/2013 | Liu et al. |
| 8,483,935 B2 | 7/2013 | Whitney et al. |
| 8,739,766 B2 | 6/2014 | Jentz et al. |
| 8,744,716 B2 | 6/2014 | Kar |
| 8,862,248 B2 | 10/2014 | Yasui |
| 8,954,257 B2 | 2/2015 | Livshiz et al. |
| 8,977,457 B2 | 3/2015 | Robinette |
| 9,062,631 B2 | 6/2015 | Kinugawa et al. |
| 9,067,593 B2 | 6/2015 | Dufford |
| 9,075,406 B2 | 7/2015 | Nakada |
| 9,145,841 B2 | 9/2015 | Miyazaki et al. |
| 9,175,628 B2 | 11/2015 | Livshiz et al. |
| 9,334,815 B2 * | 5/2016 | Cygan, Jr. ............ F01L 1/34409 |
| 9,347,381 B2 | 5/2016 | Long et al. |
| 9,388,754 B2 | 7/2016 | Cygan et al. |
| 9,388,758 B2 * | 7/2016 | Pochner .................. F02D 41/04 |
| 9,399,959 B2 | 7/2016 | Whitney et al. |
| 9,435,274 B2 | 9/2016 | Wong et al. |
| 9,541,019 B2 * | 1/2017 | Verdejo .................. F02D 41/04 |
| 9,599,049 B2 * | 3/2017 | Zavala Jurado .... F02D 41/0205 |
| 9,599,053 B2 | 3/2017 | Long et al. |
| 9,732,688 B2 * | 8/2017 | Cygan, Jr. ............... F02D 41/04 |
| 2002/0038647 A1 | 4/2002 | Tashiro |
| 2003/0074892 A1 | 4/2003 | Miura |
| 2003/0110760 A1 | 6/2003 | Shirakawa |
| 2003/0145836 A1 | 8/2003 | Linna et al. |
| 2004/0116220 A1 | 6/2004 | Yamamoto et al. |
| 2005/0065691 A1 | 3/2005 | Cho |
| 2005/0131620 A1 | 6/2005 | Bowyer |
| 2005/0171670 A1 | 8/2005 | Yoshioka et al. |
| 2006/0199699 A1 | 9/2006 | Berolund et al. |
| 2007/0174003 A1 | 7/2007 | Ueno et al. |
| 2007/0191181 A1 | 8/2007 | Burns |
| 2008/0271718 A1 | 11/2008 | Schondorf et al. |
| 2008/0308066 A1 | 12/2008 | Martin et al. |
| 2009/0018733 A1 | 1/2009 | Livshiz et al. |
| 2009/0033264 A1 | 2/2009 | Falkenstein |
| 2009/0037066 A1 | 2/2009 | Kuwahara et al. |
| 2009/0037073 A1 | 2/2009 | Jung et al. |
| 2009/0118968 A1 | 5/2009 | Livshiz et al. |
| 2009/0118969 A1 | 5/2009 | Heap et al. |
| 2009/0118972 A1 | 5/2009 | Baur et al. |
| 2009/0143959 A1 | 6/2009 | Yamaoka et al. |
| 2009/0229562 A1 | 9/2009 | Ramappan et al. |
| 2009/0292435 A1 | 11/2009 | Costin et al. |
| 2010/0049419 A1 | 2/2010 | Yoshikawa et al. |
| 2010/0057283 A1 | 3/2010 | Worthina et al. |
| 2010/0057329 A1 | 3/2010 | Livshiz et al. |
| 2010/0075803 A1 | 3/2010 | Sharples et al. |
| 2010/0116250 A1 | 5/2010 | Simon, Jr. et al. |
| 2010/0180876 A1 | 7/2010 | Leroy et al. |
| 2010/0211294 A1 | 8/2010 | Soejima |
| 2010/0263627 A1 | 10/2010 | Whitney et al. |
| 2010/0268436 A1 | 10/2010 | Soejima et al. |
| 2010/0280738 A1 | 11/2010 | Whitney et al. |
| 2011/0034298 A1 | 2/2011 | Doering et al. |
| 2011/0045948 A1 | 2/2011 | Doering et al. |
| 2011/0087421 A1 | 4/2011 | Soejima et al. |
| 2011/0100013 A1 | 5/2011 | Whitney et al. |
| 2011/0113773 A1 | 5/2011 | Liu et al. |
| 2011/0144838 A1 | 6/2011 | Matthews et al. |
| 2012/0065864 A1 | 3/2012 | Whitney et al. |
| 2012/0150399 A1 | 6/2012 | Kar et al. |
| 2013/0032123 A1 | 2/2013 | Kinugawa et al. |
| 2013/0032127 A1 | 2/2013 | Jentz et al. |
| 2013/0060448 A1 | 3/2013 | Nakada |
| 2013/0080023 A1 | 3/2013 | Livshiz et al. |
| 2013/0104859 A1 | 5/2013 | Miyazaki et al. |
| 2013/0151124 A1 | 6/2013 | Seiberlich et al. |
| 2013/0213353 A1 | 8/2013 | Rollinger et al. |
| 2014/0076279 A1 | 3/2014 | Livshiz et al. |
| 2014/0311446 A1 | 10/2014 | Whitney et al. |
| 2014/0316681 A1 | 10/2014 | Whitney et al. |
| 2014/0316682 A1 | 10/2014 | Whitney et al. |
| 2014/0316683 A1 | 10/2014 | Whitney et al. |
| 2015/0039206 A1 | 2/2015 | Storch et al. |
| 2015/0275569 A1 | 10/2015 | LeBlanc |
| 2015/0275711 A1 | 10/2015 | Whitney et al. |
| 2015/0275771 A1 | 10/2015 | Pochner et al. |
| 2015/0275772 A1 | 10/2015 | Lonq et al. |
| 2015/0275783 A1 | 10/2015 | Wong et al. |
| 2015/0275784 A1 | 10/2015 | Whitney et al. |
| 2015/0275785 A1 | 10/2015 | Cygan, Jr. et al. |
| 2015/0275786 A1 | 10/2015 | Jin et al. |
| 2015/0275789 A1 | 10/2015 | Cygan, Jr. et al. |
| 2015/0275792 A1 | 10/2015 | Genslak et al. |
| 2015/0275794 A1 | 10/2015 | Verdejo et al. |
| 2015/0275795 A1 | 10/2015 | Cygan, Jr. et al. |
| 2015/0275796 A1 | 10/2015 | Pochner et al. |
| 2015/0275806 A1 | 10/2015 | Genslak et al. |
| 2015/0315767 A1 | 11/2015 | Miyamoto |
| 2016/0237927 A1 | 8/2016 | Long et al. |
| 2017/0122235 A1 * | 5/2017 | Wong .................. F02D 41/0087 |

OTHER PUBLICATIONS

U.S. Application filed Feb. 9, 2015; U.S. Appl. No. 14/617,068, Applicant: GM Global Technology Operations LLC; Title: Throttle Control Systems and Methods Based on Pressure Ratio.
U.S. Application filed Apr. 1, 2015; U.S. Appl. No. 14/675,828, Applicant: GM Global Technology Operations LLC; Title: Model

(56) References Cited

OTHER PUBLICATIONS

Predictive Control Systems and Methods for Increasing Computational Efficiency.
U.S. Application filed Apr. 1, 2015; U.S. Appl. No. 14/675,860, Applicant: GM Global Technology Operations LLC; Title: Model Predictive Control Systems and Methods for Increasing Computational Efficiency.
John C. G. Boot; "Quadratic Programming: Algorithms, Anomalies, Applications vol. 2 of Studies in mathematical and managerial economics"; North Holland Publ.Comp., 1964; 213 pages.
N. Lawrence Ricker; "Use of quadratic programming for constrained internal model control"; Ind. Eng. Chem. Process Des. Dev., 1985, pp. 925-936.
C. E. Lemke; "A Method of Solution for Quadratic Programs"; Rensselaer Polytechnic Institute, Troy, New York, Published Online: Jul. 1, 1962, pp. 442-453.
U.S. Application filed Jun. 19, 2014; U.S. Appl. No. 14/309,047, Applicant: GM Global Technology Operations LLC; Title: Engine Speed Control Systems and Methods.
U.S. Application filed Sep. 13, 2012; U.S. Appl. No. 13/613,588, Applicant: GM Global Technology Operations LLC; Title: Coordinated Engine Torque Control.
U.S. Application filed Sep. 13, 2012; U.S. Appl. No. 13/613,683, Applicant: GM Global Technology Operations LLC; Title: Coordinated Torque Control Security Systems and Methods.
U.S. Application filed Nov. 27, 2012; U.S. Appl. No. 13/686,069, Applicant: GM Global Technology Operations LLC; Title: Airflow Control Systems and Methods.
U.S. Application filed Jun. 6, 2013; U.S. Appl. No. 13/911,121, Applicant: GM Global Technology Operations LLC; Title: Airflow Control Systems and Methods Using Model Predictive Control.
U.S. Application filed Jun. 6, 2013; U.S. Appl. No. 13/911,132, Applicant: GM Global Technology Operations LLC; Title: Airflow Control Systems and Methods Using Model Predictive Control.
U.S. Application filed Jun. 6, 2013; U.S. Appl. No. 13/911,148, Applicant: GM Global Technology Operations LLC; Title: Airflow Control Systems and Methods Using Model Predictive Control.
U.S. Application filed Jun. 6, 2013; U.S. Appl. No. 13/911,156, Applicant: GM Global Technology Operations LLC; Title: Airflow Control Systems and Methods Using Model Predictive Control.
U.S. Application filed Sep. 20, 2013; U.S. Appl. No. 14/032,508, Applicant: GM Global Technology Operations LLC; Title: Calibration Systems and Methods for Model Predictive Controllers.
U.S. Application filed Mar. 14, 2014; U.S. Appl. No. 14/225,492, Applicant: GM Global Technology Operations LLC; Title: System and Method for Managing the Period of a Control Loop for Controlling an Engine Using Model Predictive Control.
U.S. Application filed Mar. 26, 2014; U.S. Appl. No. 14/225,496, Applicant: GM Global Technology Operations LLC; Title: Engine Control Systems and Methods for Future Torque Request Increases.
U.S. Application filed Mar. 26, 2014; U.S. Appl. No. 14/225,507, Applicant: GM Global Technology Operations LLC; Title: Non-Model Predictive Control to Model Predictive Control Transitions.
U.S. Application filed Mar. 26, 2014; U.S. Appl. No. 14/225,516, Applicant: GM Global Technology Operations LLC; Title: System and Method for Adjusting a Torque Capacity of an Engine Using Model Predictive Control.
U.S. Application filed Mar. 26, 2014; U.S. Appl. No. 14/225,531, Applicant: GM Global Technology Operations LLC; Title: Diagnostic Systems and Methods Using Model Predictive Control.
U.S. Application filed Mar. 26, 2014; U.S. Appl. No. 14/225,569, Applicant: GM Global Technology Operations LLC; Title: Model Predictive Control Systems and Methods for Internal Combustion Engines.
U.S. Application filed Mar. 26, 2014; U.S. Appl. No. 14/225,587, Applicant: GM Global Technology Operations LLC; Title: System and Method for Improving the Response Time of an Engine Using Model Predictive Control.
U.S. Application filed Mar. 26, 2014; U.S. Appl. No. 14/225,626, Applicant: GM Global Technology Operations LLC; Title: Estimation Systems and Methods with Model Predictive Control.
U.S. Application filed Mar. 26, 2014; U.S. Appl. No. 14/225,808, Applicant: GM Global Technology Operations LLC; Title: Engine Control Systems and Methods for Transmission Upshifts.
U.S. Application filed Mar. 26, 2014; U.S. Appl. No. 14/225,817, Applicant: GM Global Technology Operations LLC; Title: Artificial Output Reference for Model Predictive Control.
U.S. Application filed Mar. 26, 2014; U.S. Appl. No. 14/225,891, Applicant: GM Global Technology Operations LLC; Title: Catalyst Light Off Transitions in a Gasoline Engine Using Model Predictive Control.
U.S. Application filed Mar. 26, 2014; U.S. Appl. No. 14/225,896, Applicant: GM Global Technology Operations LLC; Title: System and Method for Increasing the Temperature of a Catalyst When an Engine is Started Using Model Predictive Control.
U.S. Application filed Mar. 26, 2014; U.S. Appl. No. 14/226,006, Applicant: GM Global Technology Operations LLC; Title: Model Predictive Control Systems and Methods for Future Torque Changes.
U.S. Application filed Mar. 26, 2014; U.S. Appl. No. 14/226,121, Applicant: GM Global Technology Operations LLC; Title: Fault Diagnostic Systems and Methods for Model Predictive Control.
Kolmanovsky I., "Towards Engine and Powertrain Control Based on Model Predictive Control", (Sep. 28, 2012), Powerpoint Presentation, 47 slides.
U.S. Application filed Apr. 25, 2017; U.S. Appl. No. 15/496,746, Applicant: GM Global Technology Operations LLC; Title: A Method for Controlling an Injector for Injecting a Reductant into an Exhaust System of an Internal Combustion Engine.
Gorinevsky, "Leson 14—Model Predictive Control Part 1: The Concept," (Spring 2005), Powerpoint Presentation, 26 Slides.
Bemporad, Alberto, "Model Predictive Control," (Spring 2005), Powerpoint Presentation, 94 Slides.
Boyd, S., "Model Predictive Control," Powerpoint Presentation, 25 Slides.

\* cited by examiner

PROPULSION SYSTEM CONTROL WITH MPC

CROSS-REFERENCE TO RELATED APPLICATIONS

This application is a continuation-in-part of U.S. application Ser. No. 15/184,706, filed on Jun. 16, 2016, the contents of which are hereby incorporated-by-reference in their entirety.

TECHNICAL FIELD

The disclosure relates to a control system and method for a propulsion system of a motor vehicle having an engine and a transmission, and more particularly to a control system and method that uses a multivariable controller.

INTRODUCTION

Propulsion system control in a motor vehicle generally involves reading driver and vehicle inputs, such as accelerator pedal position, vehicle sensor data, and torque requests, and communicating these inputs to an Engine Control Module (ECM) and a Transmission Control Module (TCM). The ECM may calculate a desired axle torque from the driver and vehicle inputs. The desired axle torque may then communicated to the engine and to the TCM. The engine is controlled based on the desired axle torque to produce an actual axle torque. Meanwhile, the ECM calculates a desired speed or gear ratio from the desired axle torque and the vehicle speed. The desired gear ratio is then communicated to the transmission. The transmission is controlled based on the desired gear ratio to produce an actual gear ratio. The actual axle torque and the actual gear ratio define the operating conditions of the motor vehicle.

While this system of propulsion system control is useful for its intended purpose, there is room in the art for improvements that provide dynamic control of the axle torque to balance performance and fuel economy, especially in propulsion systems having a continuously variable transmission.

Engine control systems have been developed to control engine output torque to achieve a desired torque. Traditional engine control systems, however, do not control the engine output torque as accurately as desired.

SUMMARY

The present disclosure provides a method and system to control a parameter, such as a vehicle acceleration, in a vehicle propulsion system while optimizing fuel economy, through the use of model predictive control. In some forms, model predictive control is used to coordinate the engine and transmission to improve fuel economy and drivability.

In one form, which may be combined with or separate from other forms disclosed herein, a method for controlling a propulsion system of a motor vehicle is provided. The method includes generating a first predicted actual axle torque and a first predicted actual fuel consumption rate based on a first set of possible command values, the first set of possible command values including a first commanded engine output torque and a first commanded transmission ratio. The method also includes generating a second predicted actual axle torque and a second predicted actual fuel consumption rate based on a second set of possible command values, the second set of possible command values including a second commanded engine output torque and a second commanded transmission ratio. In practice, the method may also include determining a plurality of additional predicted actual axle torque values and predicted actual fuel consumption rate values based on additional sets of possible command values for the engine output torque and the transmission, but two of each predicted value and commanded value are described here merely as a minimum.

The method further includes determining first and second costs. The first cost is determined for the first set of possible command values based on at least a first predetermined weighting value, a second predetermined weighting value, the first predicted actual axle torque, the first predicted actual fuel consumption rate, an axle torque requested, an engine output torque requested, a transmission ratio requested, and a fuel consumption rate requested. The second cost is determined for the second set of possible command values based on at least the first predetermined weighting value, the second predetermined weighting value, the second predicted actual axle torque, the second predicted actual fuel consumption rate, the axle torque requested, the engine output torque requested, the transmission ratio requested, and the fuel consumption rate requested. The method may also include determining a plurality of additional costs for each additional set of possible command values for the engine output torque and the transmission, in cases where more than two sets of possible command values are used, which is likely to be the case for most optimization controls. First and second costs are described here as a minimum.

The method includes selecting one of the first and second sets of possible command values based on the lower of the first and second costs and setting desired command values based on the possible command values of the selected one of the first and second sets. As stated above, many more than two costs may be determined, and if so, the lowest of the costs is selected, within any constraints. The method further includes controlling a vehicle parameter based on at least one of the desired command values.

In another form, which may be combined with or separate from the other forms disclosed herein, a motor vehicle propulsion control system for a motor vehicle having a transmission and an engine is provided. The motor vehicle propulsion control system includes a prediction module configured to generate a first predicted actual axle torque and a first predicted actual fuel consumption rate based on a first set of possible command values, the first set of possible command values including a first commanded engine output torque and a first commanded transmission ratio. The prediction module is further configured to generate a second predicted actual axle torque and a second predicted actual fuel consumption rate based on a second set of possible command values, the second set of possible command values including a second commanded engine output torque and a second commanded transmission ratio. In practice, the prediction module may also be configured to determine a plurality of additional predicted actual axle torque values and predicted actual fuel consumption rate values based on additional sets of possible command values for the engine output torque and the transmission, as is likely for an optimization control system.

The control system also includes a cost module configured to determine (at least) first and second costs. The first cost is determined for the first set of possible command values based on at least a first predetermined weighting value, a second predetermined weighting value, the first predicted actual axle torque, the first predicted actual fuel consumption rate, an axle torque requested, an engine output torque requested, a transmission ratio requested, and a fuel consumption rate requested. The second cost is determined for the second set of possible command values based on at least the first predetermined weighting value, the second predetermined weighting value, the second predicted actual axle torque, the second predicted actual fuel consumption rate, the axle torque requested, the engine output torque requested, the transmission ratio requested, and the fuel consumption rate requested. The cost module may also be configured to determine a plurality of additional costs for each additional set of possible command values for the engine output torque and the transmission, in cases where more than two sets of possible command values are used, which is likely to be the case for most optimization controls. First and second costs are described here merely as a minimum.

The control system further includes a selection module configured to select one of the first and second sets (or additional sets) of possible command values based on the lower of the first and second costs (or additional determined costs) and set desired command values based on the possible command values of the selected one of the first and second sets.

In yet another form, which may be combined with or separate from the other forms disclosed herein, a propulsion system for a motor vehicle is provided. The propulsion system includes an engine operable to power the motor vehicle. The engine has an engine output shaft configured to transfer engine output torque. The propulsion system also includes a continuously variable transmission having a variator assembly including a first pulley and a second pulley. The first and second pulleys are rotatably coupled by a rotatable member. At least one of the first and second pulleys includes a movable sheave translatable along an axis to selectively change a gear ratio between the engine output shaft and a transmission output shaft. In addition, a drive axle is provided and configured to be driven via the transmission output shaft. The drive axle is configured to output axle torque to a set of wheels.

Further, the propulsion system includes a control system having a prediction module, a cost module, and a selection module. The prediction module is configured to generate a first predicted actual axle torque and a first predicted actual fuel consumption rate based on a first set of possible command values. The first set of possible command values includes a first commanded engine output torque and a first commanded transmission ratio. The prediction module is further configured to generate a second predicted actual axle torque and a second predicted actual fuel consumption rate based on a second set of possible command values. The second set of possible command values includes a second commanded engine output torque and a second commanded transmission ratio. As described above, additional sets of predicted values based on additional possible command values may also be determined. The cost module is configured to determine first and second costs (or additional costs based on additional possible command values). The first cost is determined for the first set of possible command values based on at least a first predetermined weighting value, a second predetermined weighting value, the first predicted actual axle torque, the first predicted actual fuel consumption rate, an axle torque requested, an engine output torque requested, a transmission ratio requested, and a fuel consumption rate requested. The second cost is determined for the second set of possible command values based on at least the first predetermined weighting value, the second predetermined weighting value, the second predicted actual axle torque, the second predicted actual fuel consumption rate, the axle torque requested, the engine output torque requested, the transmission ratio requested, and the fuel consumption rate requested. The selection module is configured to select one of the first and second sets (or additional sets) of possible command values based on the lower of the first and second costs (or additional costs) and set desired command values based on the possible command values of the selected one of the first and second (or additional) sets.

Further additional features may be provided with any form disclosed herein, including but not limited to the following features disclosed in paragraphs [0016] [0023].

For example, the first and second costs (or any number of a plurality of costs in the optimization control scheme) may be determined with the following cost equation:

$$\text{Cost} = \sum (y(i|k) - y_{ref})^T Q_Y (y(i|k) - y_{ref}) + $$
$$(u(i|k) - u_{ref})^T Q_U (u(i|k) - u_{ref}) + \Delta u(i|k)^T Q_{\Delta u} \Delta u(i|k)$$

$$y = \begin{bmatrix} Te\_a \\ FR\_a \\ Rat\_a \\ Ta\_a \end{bmatrix}$$

$$y_{ref} = \begin{bmatrix} Te\_r \\ FR\_r \\ Rat\_r \\ Ta\_r \end{bmatrix}$$

$$u = \begin{bmatrix} Te\_c \\ Rat\_c \end{bmatrix}$$

$$u_{ref} = \begin{bmatrix} Te\_r \\ Rat\_r \end{bmatrix},$$

where Te_a=predicted actual engine output torque; FR_a=predicted actual fuel consumption rate; Rat_a=predicted actual transmission ratio; Ta_a=predicted actual axle torque; Te_r=engine output torque requested; FR_r=fuel consumption rate requested; Rat_r=transmission ratio requested; Ta_r=axle torque requested; Te_c=commanded engine output torque; Rat_c=commanded transmission ratio; $Q_y$=a first predetermined weighting value; $Q_u$=a second predetermined weighting value; $Q_{\Delta u}$=a third predetermined weighting value; i=index value; k=prediction step; and T=transposed vector.

In some forms, the cost equation may be applied iteratively to arrive at the lowest cost for a plurality of sets of possible command values, wherein the plurality of sets of possible command values includes the first and second sets of possible command values, and the set of possible command values having the lowest cost may be selected, wherein the set of possible command values having the lowest cost is defined as one of the first and second sets of possible command values.

In addition, the method and systems may be configured to determine an accelerator pedal position PP, an engine speed RPM, a vehicle speed V, and an air-fuel ratio AF. The axle torque requested Ta_r may then be determined based on the accelerator pedal position PP and the vehicle speed V; the fuel consumption rate requested FR_r may be determined based on the axle torque requested Ta_r, the vehicle speed V, the engine speed RPM, and the air-fuel ratio AF; the transmission ratio requested Rat_r may be determined based on the axle torque requested Ta_r and the vehicle speed V; and the engine output torque requested Te_r may be determined based on the axle torque requested Ta_r the transmission ratio requested Rat_r, and the final drive ratio FD.

The first and second predicted actual axle torques (or any number of predicted actual axle torques) and the first and second predicted actual fuel consumption rates (or any number of predicted actual fuel consumption rates) may be determined with the following set of equations:

$$x_{k+1} = A * x_k + B * \begin{bmatrix} Te\_c_k \\ Rat\_c_k \end{bmatrix} + K_{KF} * \left( \begin{bmatrix} Te\_a_k \\ FR\_a_k \\ Rat\_a_k \\ Ta\_a_k \end{bmatrix} - \begin{bmatrix} Te\_m_k \\ FR\_m_k \\ Rat\_m_k \\ Ta\_m_k \end{bmatrix} \right)$$

$$\begin{bmatrix} Ta\_a_{k+1} \\ FR\_a_{k+1} \end{bmatrix} = C * x_{k+1}$$

where $x_{k+1}$=state variable at a prediction step k+1; $x_k$=state variable at a prediction step k; A=a first state matrix; B=a second state matrix; $Te\_c_k$=engine output torque commanded at the prediction step k; $Rat\_c_k$=transmission ratio commanded at the prediction step k; $K_{KF}$=a Kalman filter gain; $Te\_a_k$=predicted actual engine output torque at the prediction step k; $FR\_a_k$=predicted actual fuel consumption rate at the prediction step k; $Rat\_a_k$=predicted actual transmission ratio at the prediction step k; $Ta\_a_k$=predicted actual axle torque at the prediction step k; $Te\_m_k$=measured engine output torque at the prediction step k; $FR\_m_k$=measured fuel consumption rate at the prediction step k; $Rat\_m_k$=measured transmission ratio at the prediction step k; $Ta\_m_k$=measured axle torque at the prediction step k; $Ta\_a_{k+1}$=predicted actual axle torque at the prediction step k+1; $FR\_a_{k+1}$=predicted actual fuel consumption rate at the prediction step k+1; and C=a third state matrix.

In some forms, the first and second costs (or any number of costs) may be determined with the following more detailed cost equation:

$$\text{Cost} = \lambda_a * (Ta\_a_k - Ta\_r)^2 + \lambda_a * (Ta\_a_{k+1} - Ta\_r)^2 + \lambda_a * (Ta\_a_{k+2} - Ta\_r)^2 + \lambda_f * (FR\_a_k - FR\_r)^2 + \lambda_f * (FR\_a_{k+1} - FR\_r)^2 + \lambda_f * (FR\_a_{k+2} - FR\_r)^2 + \lambda_e * (Te\_c_k - Te\_r)^2 + \lambda_e * (Te\_c_{k+1} - Te\_r)^2 + \lambda_r * (Rat\_c_k - Rat\_r)^2 + \lambda_r * (Rat\_c_{k+1} - Rat\_r)^2 + \lambda_{\Delta r} * (\Delta Rat\_c_k)^2 + \lambda_{\Delta r} * (\Delta Rat\_c_{k+1})^2 \lambda_{\Delta e} * (\Delta Te\_c_k)^2 + \lambda_{\Delta e} * (\Delta Te\_c_{k+1})^2$$

where $\lambda_a$=a first predetermined weighting value; $Ta\_a_k$=predicted actual axle torque at a prediction step k; Ta_r=axle torque requested; $Ta\_a_{k+1}$=predicted actual axle torque at a prediction step k+1; $Ta\_a_{k+2}$=predicted actual axle torque at a prediction step k+2; $\lambda_f$=a second predetermined weighting value; $FR\_a_k$=predicted actual fuel consumption rate at the prediction step k; FR_r=fuel consumption rate requested; $FR\_a_{k+1}$=predicted actual fuel consumption rate at the prediction step k+1; $FR\_a_{k+2}$=predicted actual fuel consumption rate at the prediction step k+2; $\lambda_e$=a third predetermined weighting value; $Te\_c_k$=engine output torque commanded at the prediction step k; Te_r=engine output torque requested; $Te\_c_{k+1}$=engine output torque commanded at the prediction step k+1; $\lambda_r$=a fourth predetermined weighting value; $Rat\_c_k$=transmission ratio commanded at the prediction step k; Rat_r=transmission ratio requested; $Rat\_c_{k+1}$=transmission ratio commanded at the prediction step k+1; $\lambda_{\Delta r}$=a fifth predetermined weighting value; $\Delta Rat\_c_k$=change in transmission ratio commanded at the prediction step k; $\Delta Rat\_c_{k+1}$=change in transmission ratio commanded at the prediction step k+1; $\lambda_{\Delta e}$=a sixth predetermined weighting value; $\Delta Te\_c_k$=change in engine output torque commanded at the prediction step k; and $\Delta Te\_c_{k+1}$=change in engine output torque commanded at the prediction step k+1.

$Ta\_a_{k+1}$ and $FR\_a_{k+1}$ may be equal to the first predicted actual axle torque and the first predicted actual fuel consumption rate, respectively, when generated based on the first set of possible command values for $Te\_c_k$ and $Rat\_c_k$. On the other hand, $Ta\_a_{k+1}$ and $FR\_a_{k+1}$ may be equal to the second predicted actual axle torque and the second predicted actual fuel consumption rate, respectively, when generated based on the second set of possible command values for $Te\_c_k$ and $Rat\_c_k$.

In some forms, the control system may further include an actuation module configured to control a vehicle parameter, such as acceleration, based on at least one of the desired command values (a command value from the selected set of possible command values).

Furthermore, the controlled values may be constrained by constraints, such as:

$Te_{min} < Te\_c_k < Te_{max}$;

$Te_{min} < Te\_c_{k+1} < Te_{max}$;

$Rat_{min} < Rat\_c_k < Rat_{max}$;

$Rat_{min} < Rat\_c_{k+1} < Rat_{max}$;

$\Delta Te\_c_k < \Delta Te\_c_{max}$;

$\Delta Te\_c_{k+1} < \Delta Te\_c_{max}$;

$\Delta Rat\_c_k < \Delta Rat\_c_{max}$; and $\Delta Rat\_c_{k+1} < \Delta Rat\_c_{max}$;

where $Te_{min}$=a minimum possible engine output torque; $Te_{max}$=a maximum possible engine output torque; $Rat_{min}$=a minimum possible transmission ratio; $Rat_{max}$=a maximum possible transmission ratio; $\Delta Te\_c_{max}$=a maximum possible change in engine output torque; and $\Delta Rat\_c_{max}$=a maximum possible change in transmission ratio.

Further features, aspects and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
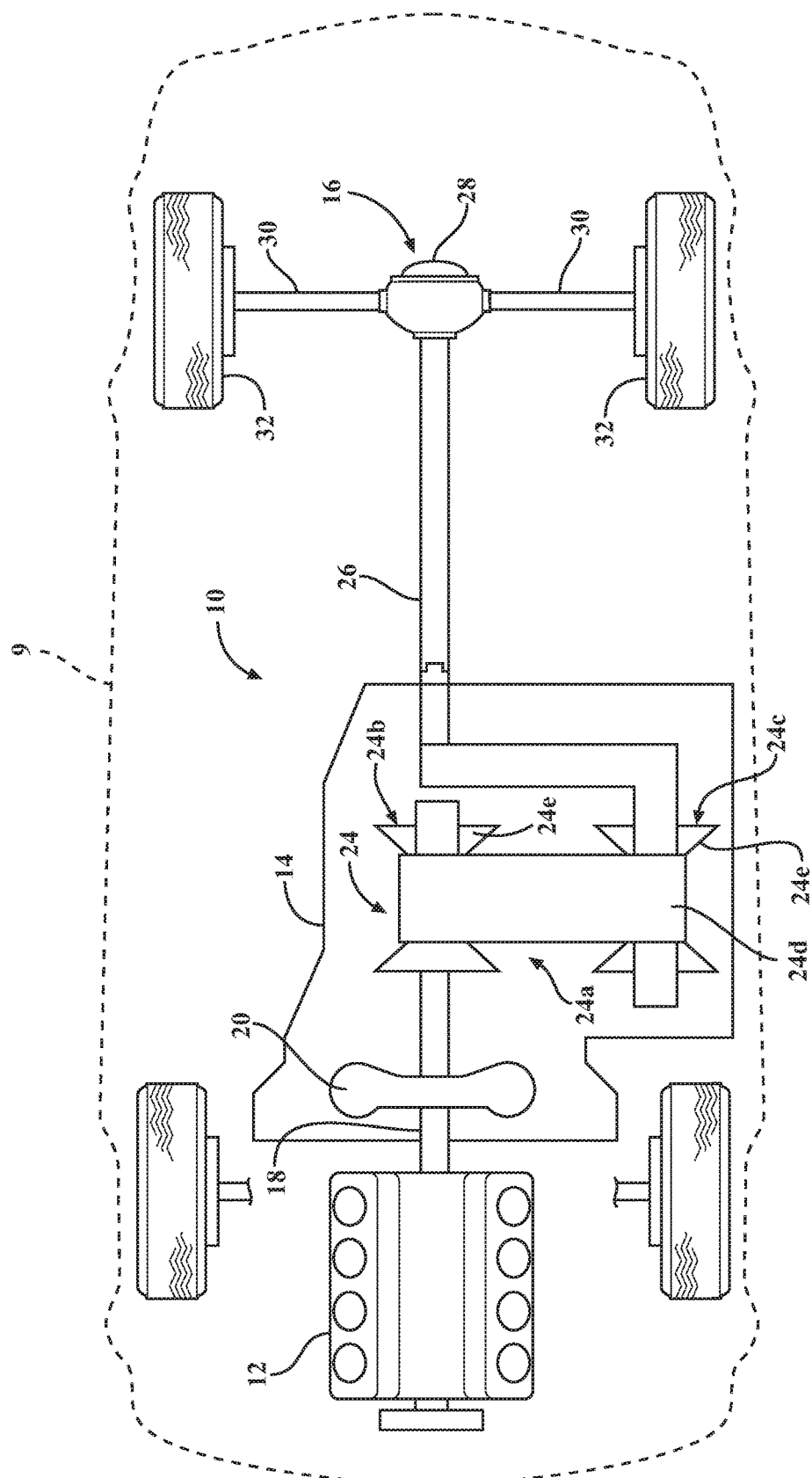
FIG. 1 is a schematic diagram of a motor vehicle having an exemplary propulsion system, in accordance with the principles of the present disclosure.

With reference to FIG. 1, an exemplary motor vehicle is shown and generally indicated by reference number 9. The motor vehicle 9 is illustrated as a passenger car, but it should be appreciated that the motor vehicle 9 may be any type of vehicle, such as a truck, van, sport-utility vehicle, etc. The motor vehicle 9 includes an exemplary propulsion system 10. It should be appreciated at the outset that while a rear-wheel drive propulsion system 10 has been illustrated, the motor vehicle 9 may have a front-wheel drive propulsion system without departing from the scope of the present disclosure.

The propulsion system 10 generally includes an engine 12 interconnected with a transmission 14 and a final drive unit 16. The engine 12 may be a conventional internal combustion engine or an electric engine, hybrid engine, or any other type of prime mover, without departing from the spirit and scope of the present disclosure. The engine 12 supplies a driving engine output torque to the transmission 14 via a crankshaft or engine output shaft 18. The driving engine output torque may be transmitted through a flexplate and/or starting device 20 to the transmission 14. The starting device 20 may be a hydrodynamic device, such as a fluid coupling or torque converter, a wet dual clutch, or an electric motor, by way of example. Torque is then transmitted from the starting device 20 to at least one transmission input shaft 22.

The transmission 14 may be a stepped transmission having planetary gears, a countershaft transmission, a continuously variable transmission, or an infinitely variable transmission. Torque from the transmission input shaft 22 is communicated through a ratio control unit 24 to a transmission output shaft 26. Generally, the ratio control unit 24 provides a plurality of forward or reverse speed or gear ratios, or an infinite number of forward or reverse speed or gear ratios, between the transmission input shaft 22 and the transmission output shaft 26.

Where the transmission 14 is a continuously variable transmission, the ratio control unit 24 may include a variator assembly 24a having first and second pulleys 24b, 24c that are rotatably coupled by an endless rotatable member 24d wrapped around the variable diameter pulleys 24b, 24c. At least one of the first and second pulleys 24b, 24c includes a movable sheave 24e translatable along an axis to selectively change a gear ratio between the engine output shaft 18 and the transmission output shaft 26.

The transmission output shaft 26 communicates output torque to the final drive unit 16. The final drive unit 16 generally includes a differential 28 that transfers axle torque through drive axles 30 to drive wheels 32.

Figure 2:
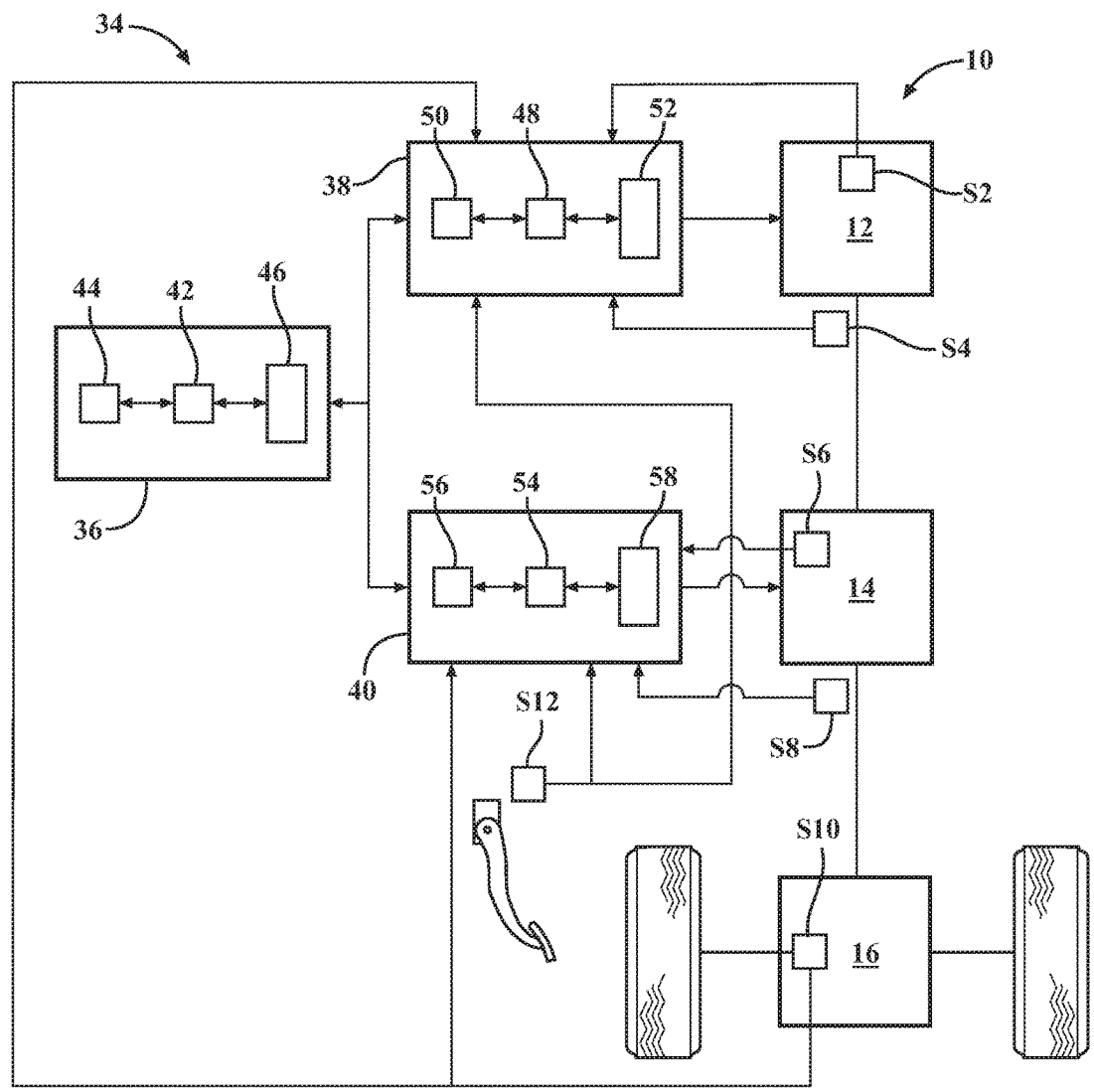
FIG. 2 is a schematic diagram showing a propulsion control system for use with the propulsion system shown in FIG. 1, according to the principles of the present disclosure.

Turning now to FIG. 2, a vehicle propulsion control system for use with the exemplary propulsion system 10 is generally indicated by reference number 34. The vehicle propulsion control system 34 includes a supervisory control module 36 in electronic communication with an engine control module 38 and a transmission control module 40. The modules 36, 38, and 40 may communicate through a vehicle network or cable area network (CAN) bus. The vehicle propulsion control system 34 may include or communicate with various other control modules, such as a body control module or infotainment control module. Alternatively, the supervisory control module 36 may be subsumed within the engine control module 38 or transmission control module 40.

The supervisory control module 36 is a non-generalized, electronic control device having a preprogrammed digital computer or processor 42, memory or non-transitory computer readable medium 44 used to store data such as control logic, instructions, image data, lookup tables, etc., and a plurality of input/output peripherals or ports 46. The processor 42 is configured to execute the control logic or instructions.

The engine control module 38 is a non-generalized, electronic control device having a preprogrammed digital computer or processor 48, memory or non-transitory computer readable medium 50 used to store data such as control logic, instructions, image data, lookup tables, etc., and a plurality of input/output peripherals or ports 52. The processor 48 is configured to execute the control logic or instructions. The engine control module 38 communicates with, and controls, the engine 12.

The transmission control module 40 is a non-generalized, electronic control device having a preprogrammed digital computer or processor 54, memory or non-transitory computer readable medium 56 used to store data such as control logic, instructions, image data, lookup tables, etc., and a plurality of input/output peripherals or ports 58. The processor 54 is configured to execute the control logic or instructions. The transmission control module 40 communicates with, and controls, the transmission 14.

The vehicle propulsion control system 34 communicates with a plurality of sensors connected to the propulsion system 10 including an air flow sensor S2 in the engine 12, an engine speed sensor S4, a transmission input shaft speed sensor S6, a transmission output shaft speed sensor S8, a vehicle speed sensor S10, and a pedal position sensor S12. The air flow sensor S2 and the engine speed sensor S4 communicate with the engine control module 38. The transmission input shaft speed sensor S6 and the transmission output shaft speed sensor S8 communicate with the transmission control module 40. The vehicle speed sensor S10 and the pedal position sensor S12 communicate with both the engine control module 38 and the transmission control module 40.

Figure 3:
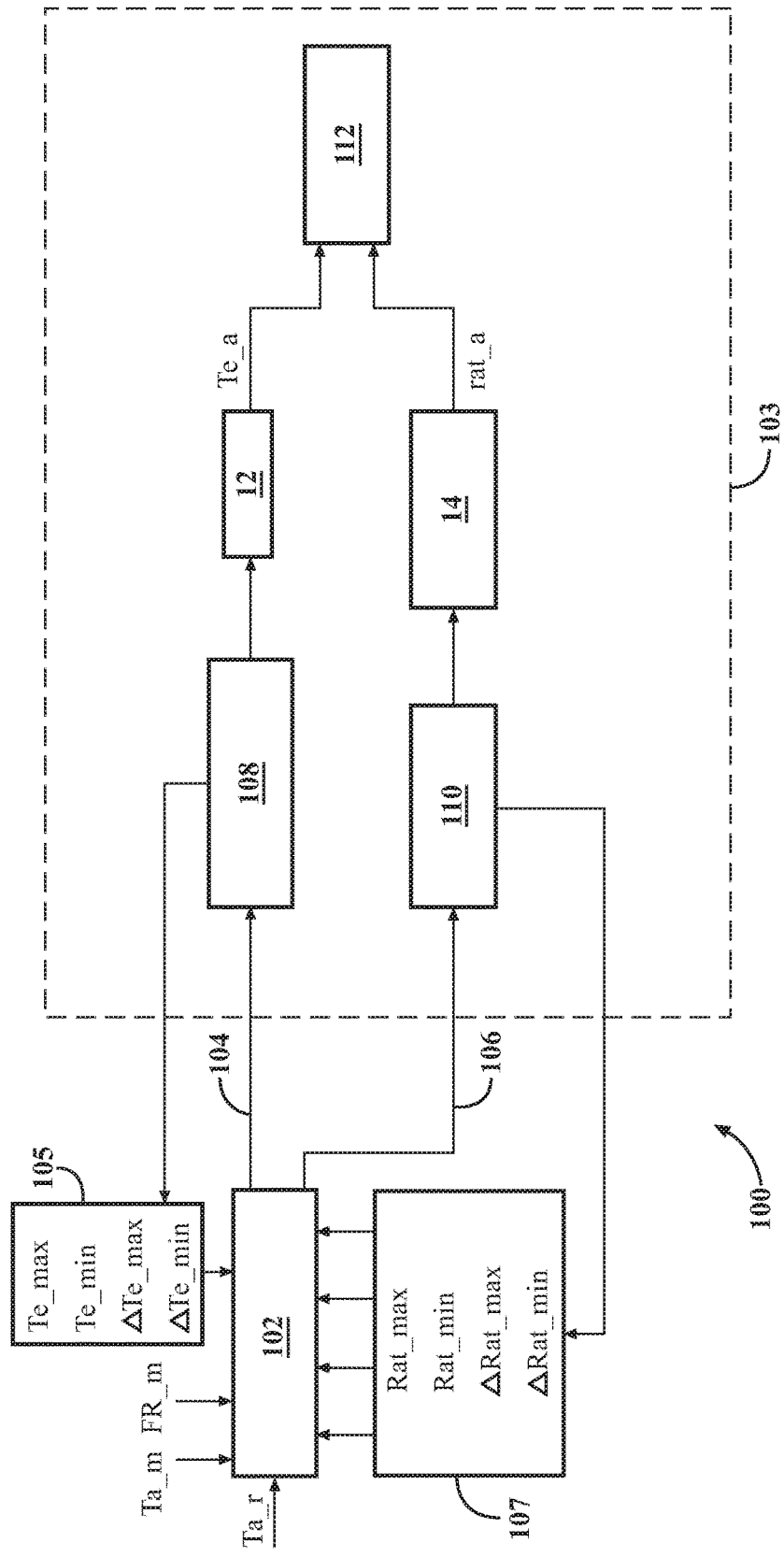
FIG. 3 is a schematic diagram of a control system for use with the propulsion control system shown in FIG. 2, in accordance with the principles of the present disclosure.

With reference to FIG. 3, and continued reference to FIGS. 1 and 2, a control diagram for the vehicle propulsion control system 34 is illustrated. The control diagram illustrates a control system or method 100 for controlling a parameter, such as vehicle acceleration, while optimizing fuel economy, which utilizes a multivariable controller. The control system 100 includes a multivariable controller 102 and a plant 103 that is controlled by the multivariable controller 102. The multivariable controller 102 may iteratively control an engine output torque Te 104 and a transmission ratio Rat 106 to optimize a fuel consumption rate FR and to achieve an axle torque Ta. The axle torque Ta is the amount of torque at the vehicle axle 30. Thus, inputs to the multivariable controller 102 include an axle torque requested Ta_r, which is based on driver and vehicle inputs, as well as a measured actual axle torque Ta_m and a measured fuel consumption rate FR_m.

The control system 100 includes an engine torque controller 108, a transmission ratio controller 110 (which may be a variator controller for CVTs), and a vehicle dynamics module 112. In some examples, the multivariable controller 102 is stored and executed by the supervisory control module 36, the engine torque controller 108 is stored and executed by the engine control module 38, and the transmission ratio controller 110 is stored and executed by the transmission control module 40. The vehicle dynamics module 112 may be stored and executed by the engine control module 38, the transmission control module 40, or any other control module or a combination of control modules.

The multivariable controller 102 receives system limitations 105 from the engine controller 108 including a maximum engine output torque $Te_{max}$, a minimum engine output torque $Te_{min}$, a maximum change in engine output torque $\Delta Te_{max}$, and a minimum change in engine output torque $\Delta Te_{min}$. The multivariable controller 102 also receives system limitations 107 from the transmission ratio controller 110 including a maximum transmission ratio $Rat_{max}$, a minimum transmission ratio $Rat_{min}$, a maximum change in transmission ratio $\Delta R_{max}$, and a minimum change in transmission ratio $\Delta R_{min}$.

Figure 4:
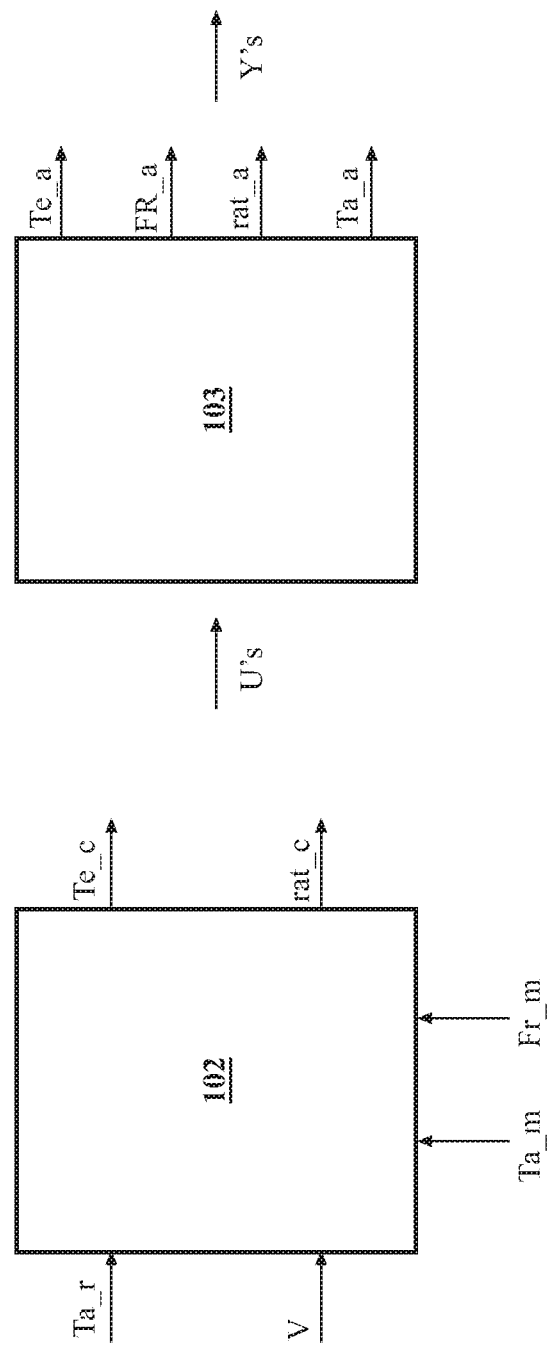
FIG. 4 is a schematic diagram illustrating additional details of the control system shown in FIG. 3, according to the principles of the present disclosure.

Referring now to FIG. 4, another representation of the control system 100 is illustrated, showing inputs and outputs to the multivariable controller 102 and the plant 103 controlled by the multivariable controller 102. For example, inputs to the multivariable controller 102 may include an axle torque requested Ta_r, as well as vehicle speed V. Feedback inputs of axle torque measured Ta_m and fuel consumption rate measured FR_m may also be input to the multivariable controller 102. Outputs of the multivariable controller 102 may include an engine output torque controlled Te_c and a transmission ratio controlled Rat_c. These controlled outputs, or "u" variables (Te_c and Rat_c), of the multivariable controller 102 are inputs to the plant 103, which includes the engine 12 and transmission 14.

The engine output torque commanded Te_c is used to control the engine 12 to provide an actual engine output torque Te_a that is the engine output torque actually communicated to the transmission 14. The transmission ratio commanded Rat_c is used to control the transmission 14 to provide an actual gear ratio or pulley ratio Rat_a between the transmission input shaft 22 and the transmission output shaft 26. Thus, the plant 103 outputs the "y" variables, the values that may be tracked, which may include actual engine torque Te_a, actual fuel consumption rate FR_a, actual transmission ratio (or pulley ratio) Rat_a, and actual axle torque Ta_a.

Figure 5:
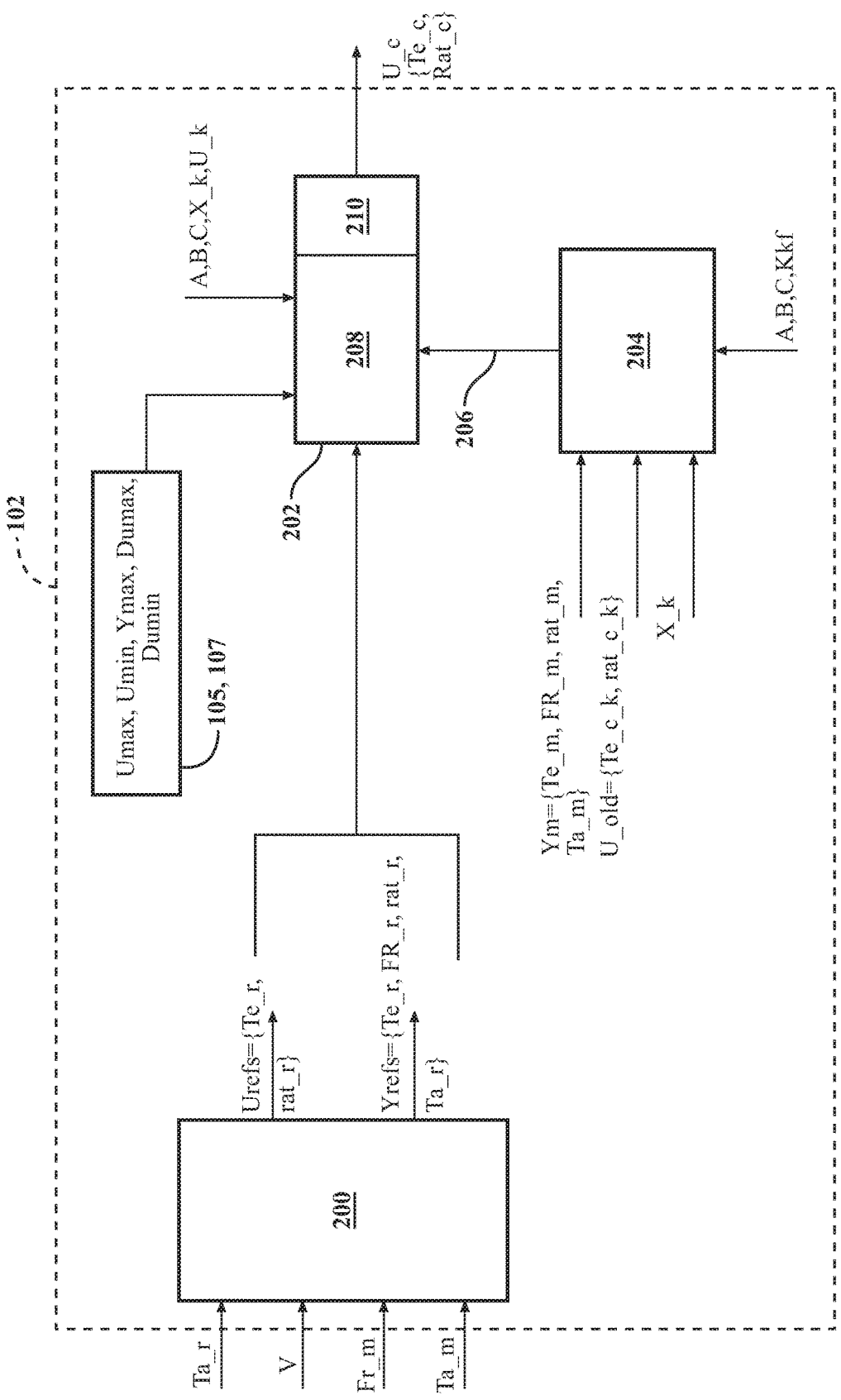
FIG. 5 is a schematic diagram illustrating additional details of a multivariable controller of the control system shown in FIGS. 3-4, in accordance with the principles of the present disclosure.

Referring now to FIG. 5, additional details of the multivariable controller 102 are illustrated. The multivariable controller 102 includes a steady state observer module 200, which is a reference generator. The steady state observer module determines reference values (desired or requested values) for the "u" variables (controlled variables) and the "y" variables (the optimized output variables that may be tracked). For example, the steady state optimizer module 200 is configured to determine an engine output torque requested Te_r, a transmission ratio requested Rat_r, a fuel consumption rate requested FR_r, and an axle torque requested Ta_r. The $u_{refs}$ include the engine output torque requested Te_r and the transmission ratio requested Rat_r, while the $y_{refs}$ may include all four of the engine output torque requested Te_r, the transmission ratio requested Rat_r, the fuel consumption rate requested FR_r, and the axle torque requested Ta_r. The $u_{refs}$ and the $y_{refs}$ are values that are desirable during a steady state. The MPC module 202, described below, optimizes the trajectory, particularly of the fuel consumption rate, during the transient from one steady state to another.

The axle torque requested Ta_r may be determined based on the accelerator pedal position PP and the vehicle speed V. For example, $$Ta\_r = f(PP, V). \quad (1)$$

In some examples, the axle torque requested Ta_r may be determined from a lookup table or 2D map from a vehicle speed V sensed by vehicle speed sensor S10 and an accelerator pedal position PP sensed by the pedal position sensor S12.

The fuel consumption rate requested FR_r is based on the axle torque requested Ta_r, the vehicle speed V, the engine speed RPM, and the air-fuel ratio AF. For example, $$FR\_r = f(Ta\_r, V, RPM, AF). \quad (2)$$

The engine speed RPM may be determined from the engine speed sensor S4. The air-fuel ratio AF is the ratio of the mass of air to the mass of fuel, which may be reported by a fuel control module, by way of example.

The transmission ratio requested Rat_r is based on the axle torque requested Ta_r and the vehicle speed V. For example, $$Rat\_r = f(Ta\_r, V). \quad (3)$$

The engine output torque requested Te_r is based on the axle torque requested Ta_r, the transmission ratio requested Rat_r, and the final drive ratio FD (which is constant for a given vehicle). For example, $$Te_r = \frac{Ta\_r + Loss}{Rat_r * FD}. \quad (4)$$

The "loss" factor may encompass mechanical losses, such as friction and pulley clamping losses, by way of example.

Once the requested values are determined, the steady state optimizer module outputs them (the u_refs and the y_refs) to the MPC module 202. The MPC module 202 uses model predictive control and may also be referred to as a quadratic programming solver, such as a Dantzig QP solver.

A prediction module 204 is configured to predict at least actual axle torque and an actual fuel consumption rate for use in the MPC module 202. The prediction module 204 may also be referred to as a state observer, which uses a Kalman filter. The predicted actual values 206 are output from the prediction module 204 to the MPC module 202.

For example, the prediction module 204 is configured to generate at least a first predicted actual axle torque and a first predicted actual fuel consumption rate based on a first set of possible command values, where the first set of possible command values includes a first commanded engine output torque Te_c and a first commanded transmission ratio Rat_c, and the prediction module 204 is further configured to generate at least a second predicted actual axle torque and a second predicted actual fuel consumption rate based on a second set of possible command values, where the second set of possible command values includes a second commanded engine output torque Te_c and a second commanded transmission ratio Rat_c. In practice, a much larger number of predicted values may be generated based on additional sets of possible command values. The predicted actual values 206 are output to the MPC module 202.

The MPC module 202 contains a cost module 208 that is configured to determine a first cost for the first set of possible command values Te_c, Rat_c based on at least first and second predetermined weighting values, the first predicted actual axle torque, the first predicted actual fuel consumption rate, the axle torque requested Ta_r, the engine output torque requested Te_r, the transmission ratio requested Rat_r, and the fuel consumption rate requested FR_r. Similarly, the cost module 208 is configured to determine a second cost for the second set of possible command values Te_c, Rat_c based on at least the first and second predetermined weighting values, the second predicted actual axle torque, the second predicted actual fuel consumption rate, the axle torque requested Ta_r, the engine output torque requested Te_r, the transmission ratio requested Rat_r, and the fuel consumption rate requested FR_r. Likewise, many more additional costs may be determined based on additional sets of predicted values and command values, in order to optimize for the lowest cost.

The MPC module 202 may also include a selection module 210 configured to select one of the first and second sets of possible command values Te_c, Rat_c (or from additional sets of possible command values) based on the lower of the first and second costs (or additional costs) and set desired command values Te_c, Rat_c based on the possible command values Te_c, Rat_c of the selected one of the first and second sets (or additional sets).

The selected command values Te_c and Rat_c are output from the MPC module 202 to the plant 103 (see FIGS. 3 and 4). The multivariable controller 102 or the plant 103 may contain an actuation module configured to control a vehicle parameter based on at least one of the desired (selected) command values Te_c, Rat_c. For example, acceleration of the vehicle 9 may be controlled to optimize the fuel consumption rate. In some forms, the actuation module may be contained within the vehicle dynamics module 112 shown in FIG. 3. Any vehicle system that varies an engine or transmission parameter may be referred to as an actuation module. In some forms, for example, the actuation module may vary the engine spark timing or the throttle, in order to control vehicle acceleration and/or axle torque.

The cost module 202 may be configured to determine the first and second costs, or any number of costs, with the following cost equation (5):

$$\text{Cost} = \sum (y(i|k) - y_{ref})^T Q_Y (y(i|k) - y_{ref}) + \qquad (5)$$
$$(u(i|k) - u_{ref})^T Q_U (u(i|k) - u_{ref}) + \Delta u(i|k)^T Q_{\Delta u} \Delta u(i|k)$$

$$y = \begin{bmatrix} Te\_a \\ FR\_a \\ Rat\_a \\ Ta\_a \end{bmatrix}$$

$$y_{ref} = \begin{bmatrix} Te\_r \\ FR\_r \\ Rat\_r \\ Ta\_r \end{bmatrix}$$

$$u = \begin{bmatrix} Te\_c \\ Rat\_c \end{bmatrix}$$

$$u_{ref} = \begin{bmatrix} Te\_r \\ Rat\_r \end{bmatrix}$$

where Te_a=predicted actual engine output torque; FR_a=predicted actual fuel consumption rate; Rat_a=predicted actual transmission ratio; Ta_a=predicted actual axle torque; Te_r=engine output torque requested; FR_r=fuel consumption rate requested; Rat_r=transmission ratio requested; Ta_r=axle torque requested; Te_c= commanded engine output torque; Rat_c=commanded transmission ratio; $Q_y$=a first predetermined weighting value; $Q_u$=a second predetermined weighting value; $Q_{\Delta u}$=a third predetermined weighting value; i=index value; k=prediction step; and T=transposed vector. In this case, there are two values for the "u" variables, $u_1$ and $u_2$, such that i=1, 2, and there are four values for the "y" variables, $y_1, y_2, y_3, y_4$, such that i=1, 2, 3, 4. The prediction step k is the prediction at a current step, the prediction step k+1 is a prediction one step ahead, and the prediction step k+2 is a prediction two steps ahead. As explained above, the $y_{ref}$ and $u_{ref}$ values may be determined by the steady state optimizer module 200.

The first and second sets of costs, or a greater number of sets of costs, may be determined even more particularly with the following equation (6), which is an MPC equation having a prediction horizon of three and a control horizon of two:

$$\begin{aligned} \text{Cost} = &\lambda_a*(Ta\_a_k - Ta\_r)^2 + \lambda_a*(Ta\_a_{k+1} - Ta\_r)^2 + \lambda_a* \\ &(Ta\_a_{k+2} - Ta\_r)^2 + \lambda_f*(FR\_a_k - FR\_r)^2 + \lambda_f* \\ &(FR\_a_{k+1} - FR\_r)^2 + \lambda_f*(FR\_a_{k+2} - FR\_r)^2 + \lambda_e* \\ &(Te\_c_k - Te\_r)^2 + \lambda_e*(Te\_c_{k+1} - Te\_r)^2 + \lambda_r*(Rat\_c_k - \\ &Rat\_r)^2 + \lambda_r*(Rat\_c_{k+1} - Rat\_r)^2 + \lambda_{\Delta r}*(\Delta Rat\_c_k)^2 + \\ &\lambda_{\Delta r}*(\Delta Rat\_c_{k+1})^2 \lambda_{\Delta e}*(\Delta Te\_c_k)^2 + \lambda_{\Delta e}* \\ &(\Delta Te\_c_{k+1})^2 \end{aligned} \qquad (6)$$

where $\lambda_a$=a first predetermined weighting value; $Ta\_a_k$=predicted actual axle torque at a prediction step k; Ta_r=axle torque requested; $Ta\_a_{k+1}$=predicted actual axle torque at a prediction step k+1; $Ta\_a_{k+2}$=predicted actual axle torque at a prediction step k+2; $\lambda_f$=a second predetermined weighting value; $FR\_a_k$=predicted actual fuel consumption rate at the prediction step k; FR_r=fuel consumption rate requested; $FR\_a_{k+1}$=predicted actual fuel consumption rate at the prediction step k+1; $FR\_a_{k+2}$=predicted actual fuel consumption rate at the prediction step k+2; $\lambda_e$=a third predetermined weighting value; $Te\_c_k$=engine output torque commanded at the prediction step k; Te_r=engine output torque requested; $Te\_c_{k+1}$=engine output torque commanded at the prediction step k+1; $\lambda_r$=a fourth predetermined weighting value; $Rat\_c_k$=transmission ratio commanded at the prediction step k; Rat_r=transmission ratio requested; $Rat\_c_{k+1}$=transmission ratio commanded at the prediction step k+1; $\lambda_{\Delta r}$=a fifth predetermined weighting value; $\Delta Rat\_c_k$=change in transmission ratio commanded at the prediction step k; $\Delta Rat\_c_{k+1}$=change in transmission ratio commanded at the prediction step k+1; $k_{\Delta e}$=a sixth predetermined weighting value; $\Delta Te\_c_k$=change in engine output torque commanded at the prediction step k; and $\Delta Te\_c_{k+1}$=change in engine output torque commanded at the prediction step k+1.

The cost equation (e.g., equation (5) or (6)) may be applied iteratively to arrive at the lowest cost for a plurality of sets of possible command values Te_c, Rat_c, where the plurality of sets of possible command values Te_c, Rat_c include the first and second sets of possible command values as well as a number of other possible sets of command values for Te_c, Rat_c. Then, the selection module 210 may select the set of possible command values Te_c, Rat_c of the plurality of command values having the lowest cost, where the set of possible command values Te_c, Rat_c having the lowest cost may be defined as one of the first and second sets of possible command values Te_c, Rat_c. Similarly, the cost module 208 may generate a surface representing the cost of possible sets of command values Te_c, Rat_c. The cost module 208 and/or the selection module 210 may then identify the possible set that has the lowest cost based on the slope of the cost surface.

The prediction module 204 may provide a number of predicted actual variables 206 to the MPC module 202 for use in the cost equation (e.g., equation (5) or (6)) by the cost module 208. The prediction module 204 may use equations such as the following to determine the predicted actual variables 206:

$$y_k = C * x_k \quad (7)$$

$$y_{k+1} = C * x_{k+1} \quad (8)$$

$$x_{k+1} = A * x_k + B * u_k + K_{KF} * (y_k - y_{mk}) \quad (9)$$

$$y_k = \begin{bmatrix} Te\_a_k \\ FR\_a_k \\ Rat\_a_k \\ Ta\_a_k \end{bmatrix}$$

$$y_{k+1} = \begin{bmatrix} Te\_a_{k+1} \\ FR\_a_{k+1} \\ Rat\_a_{k+1} \\ Ta\_a_{k+1} \end{bmatrix}$$

$$u_k = \begin{bmatrix} Te\_c_k \\ Rat\_c_k \end{bmatrix}$$

$$y_{mk} = \begin{bmatrix} Te\_m_k \\ FR\_m_k \\ Rat\_m_k \\ Ta\_m_k \end{bmatrix}$$

where A=a first state matrix; B=a second state matrix; C=a third state matrix; $Te\_a_k$=predicted actual engine output torque at the prediction step k; $FR\_a_k$=predicted actual fuel consumption rate at the prediction step k; $Rat\_a_k$=predicted actual transmission ratio at the prediction step k; $Ta\_a_k$=predicted actual axle torque at the prediction step k; $x_k$=state variable at a prediction step k; $Te\_a_{k+1}$=predicted actual engine output torque at the prediction step k+1; $FR\_a_{k+1}$=predicted actual fuel consumption rate at the prediction step k+1; $Rat\_a_{k+1}$=predicted actual transmission ratio at the prediction step k+1; $Ta\_a_{k+1}$=predicted actual axle torque at the prediction step k+1; $x_{k+1}$=state variable at a prediction step k+1; $Te\_c_k$=engine output torque commanded at the prediction step k; $Rat\_c_k$=transmission ratio commanded at the prediction step k; $K_{KF}$=a Kalman filter gain; $Te\_m_k$=measured engine output torque at the prediction step k; $FR\_m_k$=measured fuel consumption rate at the prediction step k; $Rat\_m_k$=measured transmission ratio at the prediction step k; and $Ta\_m_k$=measured axle torque at the prediction step k. The prediction step k is a prediction step at the current time (e.g., now).

Measured engine output torque Te_m may be sensed from the engine torque sensor S4. The measured transmission ratio, or pulley ratio, Rat_m may be determined from the speed of the transmission input shaft 22 sensed by the transmission input shaft speed sensor S6 and the speed of the transmission output shaft 26 sensed by the transmission output shaft speed sensor S8.

The sets of equations for the prediction module may be rewritten as follows with the matrix values inserted:

$$\begin{bmatrix} Ta\_a_k \\ FR\_a_k \end{bmatrix} = C * x_k \quad (10)$$

$$\begin{bmatrix} Ta\_a_{k+1} \\ FR\_a_{k+1} \end{bmatrix} = C * x_{k+1} \quad (11)$$

$$x_{k+1} = A * x_k + B * \begin{bmatrix} Te\_c_k \\ Rat\_c_k \end{bmatrix} + K_{KF} * \left( \begin{bmatrix} Te\_a_k \\ FR\_a_k \\ Rat\_a_k \\ Ta\_a_k \end{bmatrix} - \begin{bmatrix} Te\_m_k \\ FR\_m_k \\ Rat\_m_k \\ Ta\_m_k \end{bmatrix} \right) \quad (12)$$

$Ta\_a_{k+1}$ and $FR\_a_{k+1}$ may be defined as or equal to the first predicted actual axle torque and the first predicted actual fuel consumption rate, respectively, when generated based on the first set of possible command values for $Te\_c_k$ and $Rat\_c_k$, and $Ta\_a_{k+1}$ and $FR\_a_{k+1}$ may be defined as or equal to the second predicted actual axle torque and the second predicted actual fuel consumption rate, respectively, when generated based on the second set of possible command values for $Te\_c_k$ and $Rat\_c_k$.

The cost equation (e.g., equation (5) or (6)) may be subject to the following constraints 105, 107:

$$Te_{min} < Te\_c_k < Te_{max};$$

$$Te_{min} < Te\_c_{k+1} < Te_{max};$$

$$Rat_{min} < Rat\_c_k < Rat_{max};$$

$$Rat_{min} < Rat\_c_{k+1} < Rat_{max};$$

$$\Delta Rat\_c_k < \Delta Rat\_c_{max};$$

$$\Delta Rat\_c_{k+1} < \Delta Rat\_c_{max};$$

$$\Delta Te\_c_k < \Delta Te\_c_{max}; \text{ and}$$

$$\Delta Te\_c_{k+1} < \Delta Te\_c_{max},$$

where $Te_{min}$=a minimum possible engine output torque, $Te_{max}$=a maximum possible engine output torque, $Rat_{min}$=a minimum possible transmission ratio, $Rat_{max}$=a maximum possible transmission ratio, $\Delta Rat\_c_{max}$=a maximum possible change in transmission ratio, and $\Delta Te\_c_{max}$=a maximum possible change in engine output torque.

The constants, matrices, and gain referred to above, including A, B, C, $K_{KF}$, $Q_y$, $Q_u$, $Q_{\Delta u}$, $\lambda_a$, $\lambda_f$, $\lambda_e$, $\lambda_r$, $k_{\Delta e}$, $k_{\Delta r}$, are parameters of the system determined through testing, physical models, or other means. In some variations, a system identification procedure is run offline, for example, during a calibration, to identify the constants, matrices, and gain, and also to define $u_0$ and $y_0$. Once $u_0$ and $y_0$ are known, then $x_0$ can be computed from the prediction module equations (e.g., equations (7)-(12) or a subset thereof). Thereafter, each of the prediction module 204 and MPC module 202 equations (e.g., equations (5)-(12) or a subset thereof) can be run to obtain initial values offline. Then, the control system 102 can be run online to constantly optimize the controlled parameters Te_c and Rat_c as the vehicle 9 is running through steady state and transient states. The constants allow the cost to be determined based on the relationship between and relative importance of each of the commanded values Te_c, Rat_c and tracked values (e.g., FR_a, Ta_a, Rat_a, Te_a). The relationships are weighted to control the effect that each relationship has on the cost.

In some forms, the MPC module 202 may generate the command values Te_c, Rat_c by determining possible sequences, sets, or a surface containing the command values Te_c, Rat_c that could be used for N future control loops. The prediction module 204 may determine predicted responses to the possible sets of the command values Te_c, Rat_c using the prediction module equations (e.g., equations (7)-(12) or a subset thereof). For example, the prediction module 204 may determine a set of predicted actual axle torques Ta_a and a set of predicted actual fuel consumption rates FR_a for N control loops.

More particularly, a set of N values for each command value Te_c, Rat_c may be determined, and a set of M values for each predicted actual value Ta_a, FR_a may be determined based on the N command values Te_c, Rat_c. The cost module 208 may then determine the cost value for each of the possible sets of command values Te_c, Rat_c based on the predicted actual parameters Ta_a, FR_a (which may include $Ta\_a_k$, $Ta\_a_{k+1}$, $Ta\_a_{k+2}$, $FR\_a_k$, $FR\_a_{k+1}$, and $FR\_a_{k+2}$, depending on the particular cost equation (5), (6) used). The selection module 210 may then select one of the possible sets of the command values Te_c, Rat_c based on the costs of the possible sets, respectively. For example, the selection module 210 may select the possible set of command values Te_c, Rat_c having the lowest cost while satisfying the system constraints 105, 107 (e.g., $Te_{min} < Te\_c_k < Te_{max}$; $Te_{min} < Te\_c_{k+1} < Te_{max}$; $Rat_{min} < Rat\_c_k < Rat_{max}$; $Rat_{min} < Rat\_c_{k+1} < Rat_{max}$; $\Delta Te\_c_k < \Delta Te\_c_{max}$; $\Delta Te\_c_{k+1} < \Delta Te\_c_{max}$; $\Delta Rat\_c_k < \Delta Rat\_c_{max}$; $\Delta Rat\_c_{k+1} < \Delta Rat\_c_{max}$).

In some forms, satisfaction of the constraints 105, 107 may be considered in the cost determination. For example, the cost module 208 may determine the cost values further based on the constraints 105, 107, and the selection module 210 may select the possible set of command values Te_c, Rat_c that best achieves the axle torque request Ta while minimizing fuel consumption rate FR that has been determined to comply with the constraints 105, 107.

During steady-state operation, the command values Te_c, Rat_c may settle at or near the reference, or requested, values Te_r, Rat_r, respectively. During transient operation, however, the MPC module 202 may adjust the command values Te_c, Rat_c away from the reference values Te_r, Rat_r in order to best achieve the torque request Ta_r, while minimizing the fuel consumption rate FR and satisfying the constraints 105, 107.

In operation, the MPC module 202 may determine the cost values for the possible sets of controlled and predicted values (u, y). The MPC module 202 may then select the one of the possible sets having the lowest cost. The MPC module 202 may next determine whether the selected possible set satisfies the constraints 105, 107. If so, the possible set may be used. If not, the MPC module 202 determines, based on the selected possible set, a possible set that satisfies the constraints 105, 107 and that has the lowest cost. The MPC module 202 may use the possible set that satisfies the constraints 105, 107 and that has the lowest cost.

Figure 6:
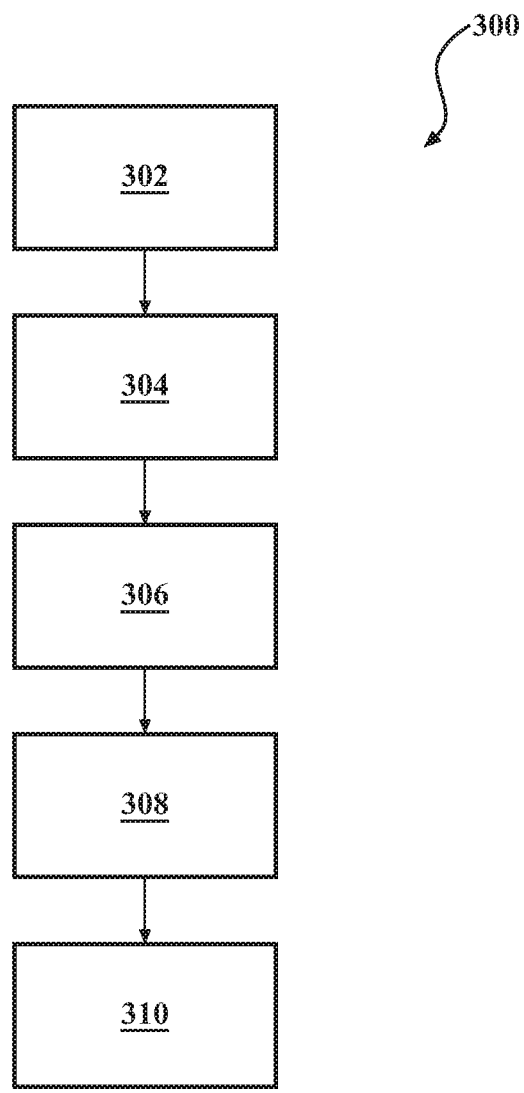
FIG. 6 is a block diagram illustrating a method for a controlling a vehicle propulsion system, according to the principles of the present disclosure.

Referring now to FIG. 6, a flowchart depicting an example method for controlling the propulsion system 10 of the motor vehicle 9 is presented and generally designated at 300. The method 300 includes a step 302 of generating a number of predicted actual axle torques (at least first and second predicted actual axle torques) and a number of predicted actual fuel consumption rates (at least first and second predicted actual fuel consumption rates) based on a number of sets (at least two) of possible command values. For example, the first set of possible command values includes a first commanded engine output torque and a first commanded transmission ratio, the second set of possible command values includes a second commanded engine output torque and a second commanded transmission ratio, and so on as desired. The step 302 may be performed, for example, by the prediction module 204 shown in FIG. 5.

The method 300 then includes a step 304 of determining a cost for each set of possible command values. Each cost is determined based on at least first and second predetermined weighting values, the predicted actual axle torque for the particular set, the predicted actual fuel consumption rate for the particular set, the axle torque requested, the engine output torque requested, the transmission ratio requested, and the fuel consumption rate requested. The step 304 may be performed by the cost module 208.

The method 300 may also include a step 306 of selecting one of the sets of possible command values based on the lowest of the determined costs. Once the set of possible command values based on the lowest cost is identified, the method 300 includes a step 308 of setting desired command values based on the possible command values of the selected set. In some variations, the possible set of command values is subject to a set of constraints 105, 107, as described above. Finally, the method 300 may include a step 310 of controlling a vehicle parameter, such as acceleration, based on at least one of the desired command values.

The method 300 may accomplish the steps 302, 304, 306, 308, 310 in any of the ways described above, such as by applying any of the equations (1)-(12). Further, the method 300 may include determining the axle torque requested, the engine output torque requested, the fuel consumption rate requested, and the transmission ratio requested by, as explained above, determining the accelerator pedal position PP, the engine speed RPM, the vehicle speed V, the final drive ratio FD, and the air-fuel ratio AF, and applying the equations (1)-(4) above, if desired.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The control system 100 may be configured to execute each of the steps of the method 300. Thus, the entire description with respect to FIGS. 1-6 may be applied by the control system 100 to effectuate the method 300 shown in FIG. 6. Furthermore, the control system 100 may be or include a controller that includes a number of control logics that are configured to execute the steps of the method 300.

The controller(s) of the control system 100 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the many aspects of the present disclosure. While certain aspects have been described in detail, various alternative aspects exist for practicing the invention as defined in the appended claims.

What is claimed is:

1. A method for controlling a propulsion system of a motor vehicle, the method comprising:
   generating a first predicted actual axle torque and a first predicted actual fuel consumption rate based on a first set of possible command values, the first set of possible command values including a first commanded engine output torque and a first commanded transmission ratio;
   generating a second predicted actual axle torque and a second predicted actual fuel consumption rate based on a second set of possible command values, the second set of possible command values including a second commanded engine output torque and a second commanded transmission ratio;
   determining a first cost for the first set of possible command values based on a first predetermined weighting value, a second predetermined weighting value, the first predicted actual axle torque, the first predicted actual fuel consumption rate, an axle torque requested, an engine output torque requested, a transmission ratio requested, and a fuel consumption rate requested;
   determining a second cost for the second set of possible command values based on the first predetermined weighting value, the second predetermined weighting value, the second predicted actual axle torque, the second predicted actual fuel consumption rate, the axle torque requested, the engine output torque requested, the transmission ratio requested, and the fuel consumption rate requested;
   selecting one of the first and second sets of possible command values based on the lower of the first and second costs;
   setting desired command values based on the possible command values of the selected one of the first and second sets; and
   controlling a vehicle parameter based on at least one of the desired command values.

2. The method of claim 1, further comprising determining the first and second costs with the following cost equation:

$$\text{Cost} = \sum (y(i|k) - y_{ref})^T Q_Y (y(i|k) - y_{ref}) +$$
$$(u(i|k) - u_{ref})^T Q_U (u(i|k) - u_{ref}) + \Delta u(i|k)^T Q_{\Delta u} \Delta u(i|k)$$

$$y = \begin{bmatrix} \text{Te\_a} \\ \text{FR\_a} \\ \text{Rat\_a} \\ \text{Ta\_a} \end{bmatrix}$$

$$y_{ref} = \begin{bmatrix} \text{Te\_r} \\ \text{FR\_r} \\ \text{Rat\_r} \\ \text{Ta\_r} \end{bmatrix}$$

$$u = \begin{bmatrix} \text{Te\_c} \\ \text{Rat\_c} \end{bmatrix}$$

$$u_{ref} = \begin{bmatrix} \text{Te\_r} \\ \text{Rat\_r} \end{bmatrix}$$

where
Te_a=predicted actual engine output torque;
FR_a=predicted actual fuel consumption rate;
Rat_a=predicted actual transmission ratio;
Ta_a=predicted actual axle torque;

Te_r=engine output torque requested;
FR_r=fuel consumption rate requested;
Rat_r=transmission ratio requested;
Ta_r=axle torque requested;
Te_c=commanded engine output torque;
Rat_c=commanded transmission ratio;
$Q_y$=the first predetermined weighting value;
$Q_u$=the second predetermined weighting value;
$Q_{\Delta u}$=a third predetermined weighting value;
i=index value;
k=prediction step; and
T=transposed vector.

3. The method of claim 2, further comprising applying the cost equation iteratively to arrive at the lowest cost for a plurality of sets of possible command values, the plurality of sets of possible command values including the first and second sets of possible command values, the method further comprising selecting the set of possible command values of the plurality of command values having the lowest cost, wherein the set of possible command values having the lowest cost is defined as one of the first and second sets of possible command values.

4. The method of claim 3, further comprising:
determining an accelerator pedal position (PP);
determining an engine speed (RPM);
determining a vehicle speed (V);
determining an air-fuel ratio (AF);
determining the axle torque requested (Ta_r) based on the accelerator pedal position (PP) and the vehicle speed (V);
determining the fuel consumption rate requested (FR_r) based on the axle torque requested (Ta_r), the vehicle speed (V), the engine speed (RPM), and the air-fuel ratio (AF);
determining the transmission ratio requested (Rat_r) based on the axle torque requested (Ta_r) and the vehicle speed (V); and
determining the engine output torque requested (Te_r) based on the axle torque requested (Ta_r), the transmission ratio requested (Rat_r), and a final drive ratio (FD).

5. The method of claim 4, further comprising determining the first and second predicted actual axle torques and the first and second predicted actual fuel consumption rates with the following set of equations:

$$x_{k+1} = A * x_k + B * \begin{bmatrix} Te\_c_k \\ Rat\_c_k \end{bmatrix} + K_{KF} * \left( \begin{bmatrix} Te\_a_k \\ FR\_a_k \\ Rat\_a_k \\ Ta\_a_k \end{bmatrix} - \begin{bmatrix} Te\_m_k \\ FR\_m_k \\ Rat\_m_k \\ Ta\_m_k \end{bmatrix} \right)$$

$$\begin{bmatrix} Ta\_a_{k+1} \\ FR\_a_{k+1} \end{bmatrix} = C * x_{k+1}$$

where
$x_{k+1}$=state variable at a prediction step k+1;
$x_k$=state variable at a prediction step k;
A=a first state matrix;
B=a second state matrix;
$Te\_c_k$=engine output torque commanded at the prediction step k;
$Rat\_c_k$=transmission ratio commanded at the prediction step k;
$K_{KF}$=a Kalman filter gain;
$Te\_a_k$=predicted actual engine output torque at the prediction step k;
$FR\_a_k$=predicted actual fuel consumption rate at the prediction step k;
$Rat\_a_k$=predicted actual transmission ratio at the prediction step k;
$Ta\_a_k$=predicted actual axle torque at the prediction step k;
$Te\_m_k$=measured engine output torque at the prediction step k;
$FR\_m_k$=measured fuel consumption rate at the prediction step k;
$Rat\_m_k$=measured transmission ratio at the prediction step k;
$Ta\_m_k$=measured axle torque at the prediction step k;
$Ta\_a_{k+1}$=predicted actual axle torque at the prediction step k+1;
$FR\_a_{k+1}$=predicted actual fuel consumption rate at the prediction step k+1; and
C=a third state matrix,
wherein $Ta\_a_{k+1}$ and $FR\_a_{k+1}$ are equal to the first predicted actual axle torque and the first predicted actual fuel consumption rate, respectively, when generated based on the first set of possible command values for $Te\_c_k$ and $Rat\_c_k$, and $Ta\_a_{k+1}$ and $FR\_a_{k+1}$ are equal to the second predicted actual axle torque and the second predicted actual fuel consumption rate, respectively, when generated based on the second set of possible command values for $Te\_c_k$ and $Rat\_c_k$.

6. The method of claim 1, further comprising determining the first and second costs with the following cost equation:

$$\text{Cost} = \lambda_a * (Ta\_a_k - Ta\_r)^2 + \lambda_a * (Ta\_a_{k+1} - Ta\_r)^2 + \lambda_a * (Ta\_a_{k+2} - Ta\_r)^2 + \lambda_f * (FR\_a_k - FR\_r)^2 + \lambda_f * (FR\_a_{k+1} - FR\_r)^2 + \lambda_f * (FR\_a_{k+2} - FR\_r)^2 + \lambda_e * (Te\_c_k - Te\_r)^2 + \lambda_e * (Te\_c_{k+1} - Te\_r)^2 + \lambda_r * (Rat\_c_k - Rat\_r)^2 + \lambda_r * (Rat\_c_{k+1} - Rat\_r)^2 + \lambda_{\Delta r} * (\Delta Rat\_c_k)^2 + \lambda_{\Delta r} * (\Delta Rat\_c_{k+1})^2 \lambda_{\Delta e} * (\Delta Te\_c_k)^2 + \lambda_{\Delta e} * (\Delta Te\_c_{k+1})^2$$

where
$\lambda_a$=the first predetermined weighting value;
$Ta\_a_k$=predicted actual axle torque at a prediction step k;
Ta_r=axle torque requested;
$Ta\_a_{k+1}$=predicted actual axle torque at a prediction step k+1;
$Ta\_a_{k+2}$=predicted actual axle torque at a prediction step k+2;
$\lambda_f$=the second predetermined weighting value;
$FR\_a_k$=predicted actual fuel consumption rate at the prediction step k;
FR_r=fuel consumption rate requested;
$FR\_a_{k+1}$=predicted actual fuel consumption rate at the prediction step k+1;
$FR\_a_{k+2}$=predicted actual fuel consumption rate at the prediction step k+2;
$\lambda_e$=a third predetermined weighting value;
$Te\_c_k$=engine output torque commanded at the prediction step k;
Te_r=engine output torque requested;
$Te\_c_{k+1}$=engine output torque commanded at the prediction step k+1;
$\lambda_r$=a fourth predetermined weighting value;
$Rat\_c_k$=transmission ratio commanded at the prediction step k;
Rat_r=transmission ratio requested;
$Rat\_c_{k+1}$=transmission ratio commanded at the prediction step k+1;
$\lambda_{\Delta r}$=a fifth predetermined weighting value;
$\Delta Rat\_c_k$=change in transmission ratio commanded at the prediction step k;

ΔRat_c$_{k+1}$=change in transmission ratio commanded at the prediction step k+1;
λ$_{Δe}$=a sixth predetermined weighting value;
ΔTe_c$_k$=change in engine output torque commanded at the prediction step k; and
ΔTe_c$_{k+1}$=change in engine output torque commanded at the prediction step k+1,
wherein Ta_a$_{k+1}$ and FR_a$_{k+1}$ are equal to the first predicted actual axle torque and the first predicted actual fuel consumption rate, respectively, when generated based on the first set of possible command values for Te_c$_k$ and Rat_c$_k$, and Ta_a$_{k+1}$ and FR_a$_{k+1}$ are equal to the second predicted actual axle torque and the second predicted actual fuel consumption rate, respectively, when generated based on the second set of possible command values for Te_c$_k$ and Rat_c$_k$.

7. The method of claim 6, further comprising determining the first and second predicted actual axle torques and the first and second predicted actual fuel consumption rates with the following set of equations:

$$x_{k+1} = A*x_k + B*\begin{bmatrix} Te\_c_k \\ Rat\_c_k \end{bmatrix} + K_{KF}*\left(\begin{bmatrix} Te\_a_k \\ FR\_a_k \\ Rat\_a_k \\ Ta\_a_k \end{bmatrix} - \begin{bmatrix} Te\_m_k \\ FR\_m_k \\ Rat\_m_k \\ Ta\_m_k \end{bmatrix}\right)$$

$$\begin{bmatrix} Ta\_a_{k+1} \\ FR\_a_{k+1} \end{bmatrix} = C*x_{k+1}$$

where
x$_{k+1}$=state variable at the prediction step k+1;
x$_k$=state variable at the prediction step k;
A=a first state matrix;
B=a second state matrix;
K$_{KF}$=a Kalman filter gain;
Te_a$_k$=predicted actual engine output torque at the prediction step k;
Rat_a$_k$=predicted actual transmission ratio at the prediction step k;
Te_m$_k$=measured engine output torque at the prediction step k;
FR_m$_k$=measured fuel consumption rate at the prediction step k;
Rat_m$_k$=measured transmission ratio at the prediction step k;
Ta_m$_k$=measured axle torque at the prediction step k; and
C=a third state matrix.

8. A motor vehicle propulsion control system for a motor vehicle having a transmission and an engine, the motor vehicle propulsion control system comprising:
a prediction module configured to generate a first predicted actual axle torque and a first predicted actual fuel consumption rate based on a first set of possible command values, the first set of possible command values including a first commanded engine output torque and a first commanded transmission ratio, the prediction module being further configured to generate a second predicted actual axle torque and a second predicted actual fuel consumption rate based on a second set of possible command values, the second set of possible command values including a second commanded engine output torque and a second commanded transmission ratio;
a cost module configured to:
determine a first cost for the first set of possible command values based on a first predetermined weighting value, a second predetermined weighting value, the first predicted actual axle torque, the first predicted actual fuel consumption rate, an axle torque requested, an engine output torque requested, a transmission ratio requested, and a fuel consumption rate requested; and
determine a second cost for the second set of possible command values based on the first predetermined weighting value, the second predetermined weighting value, the second predicted actual axle torque, the second predicted actual fuel consumption rate, the axle torque requested, the engine output torque requested, the transmission ratio requested, and the fuel consumption rate requested; and
a selection module configured to select one of the first and second sets of possible command values based on the lower of the first and second costs and set desired command values based on the possible command values of the selected one of the first and second sets.

9. The motor vehicle propulsion control system of claim 8, further comprising an actuation module configured to control a vehicle parameter based on at least one of the desired command values.

10. The motor vehicle propulsion control system of claim 9, wherein the cost module is configured to determine the first and second costs with the following cost equation:

$$\text{Cost} = \sum (y(i|k) - y_{ref})^T Q_Y (y(i|k) - y_{ref}) +$$
$$(u(i|k) - u_{ref})^T Q_U (u(i|k) - u_{ref}) + \Delta u(i|k)^T Q_{\Delta u} \Delta u(i|k)$$

$$y = \begin{bmatrix} Te\_a \\ FR\_a \\ Rat\_a \\ Ta\_a \end{bmatrix}$$

$$y_{ref} = \begin{bmatrix} Te\_r \\ FR\_r \\ Rat\_r \\ Ta\_r \end{bmatrix}$$

$$u = \begin{bmatrix} Te\_c \\ Rat\_c \end{bmatrix}$$

$$u_{ref} = \begin{bmatrix} Te\_r \\ Rat\_r \end{bmatrix}$$

where
Te_a=predicted actual engine output torque;
FR_a=predicted actual fuel consumption rate;
Rat_a=predicted actual transmission ratio;
Ta_a=predicted actual axle torque;
Te_r=engine output torque requested;
FR_r=fuel consumption rate requested;
Rat_r=transmission ratio requested;
Ta_r=axle torque requested;
Te_c=commanded engine output torque;
Rat_c=commanded transmission ratio;
Q$_Y$=the first predetermined weighting value;
Q$_U$=the second predetermined weighting value;
Q$_{Δu}$=a third predetermined weighting value;

i=index value;
k=prediction step; and
T=transposed vector.

11. The motor vehicle propulsion control system of claim 10, further comprising a steady state optimizer module configured to:
   determine an accelerator pedal position (PP);
   determine an engine speed (RPM);
   determine a vehicle speed (V);
   determine an air-fuel ratio (AF);
   determine the axle torque requested (Ta_r) based on the accelerator pedal position (PP) and the vehicle speed (V);
   determine the fuel consumption rate requested (FR_r) based on the axle torque requested (Ta_r), the vehicle speed (V), the engine speed (RPM), and the air-fuel ratio (AF);
   determine the transmission ratio requested (Rat_r) based on the axle torque requested (Ta_r) and the vehicle speed (V); and
   determine the engine output torque requested (Te_r) based on the axle torque requested (Ta_r), the transmission ratio requested (Rat_r), and a final drive ratio (FD).

12. The motor vehicle propulsion control system of claim 11, wherein the prediction module is further configured to determine the first and second predicted actual axle torques and the first and second predicted actual fuel consumption rates with the following set of equations:

$$x_{k+1} = A * x_k + B * \begin{bmatrix} Te\_c_k \\ Rat\_c_k \end{bmatrix} + K_{KF} * \left( \begin{bmatrix} Te\_a_k \\ FR\_a_k \\ Rat\_a_k \\ Ta\_a_k \end{bmatrix} - \begin{bmatrix} Te\_m_k \\ FR\_m_k \\ Rat\_m_k \\ Ta\_m_k \end{bmatrix} \right)$$

$$\begin{bmatrix} Ta\_a_{k+1} \\ FR\_a_{k+1} \end{bmatrix} = C * x_{k+1}$$

where
$x_{k+1}$=state variable at a prediction step k+1;
$x_k$=state variable at a prediction step k;
A=a first state matrix;
B=a second state matrix;
$Te\_c_k$=engine output torque commanded at the prediction step k;
$Rat\_c_k$=transmission ratio commanded at the prediction step k;
$K_{KF}$=a Kalman filter gain;
$Te\_a_k$=predicted actual engine output torque at the prediction step k;
$FR\_a_k$=predicted actual fuel consumption rate at the prediction step k;
$Rat\_a_k$=predicted actual transmission ratio at the prediction step k;
$Ta\_a_k$=predicted actual axle torque at the prediction step k;
$Te\_m_k$=measured engine output torque at the prediction step k;
$FR\_m_k$=measured fuel consumption rate at the prediction step k;
$Rat\_m_k$=measured transmission ratio at the prediction step k;
$Ta\_m_k$=measured axle torque at the prediction step k;
$Ta\_a_{k+1}$=predicted actual axle torque at the prediction step k+1;
$FR\_a_{k+1}$=predicted actual fuel consumption rate at the prediction step k+1; and
C=a third state matrix,
   wherein $Ta\_a_{k+1}$ and $FR\_a_{k+1}$ are equal to the first predicted actual axle torque and the first predicted actual fuel consumption rate, respectively, when generated based on the first set of possible command values for $Te\_c_k$ and $Rat\_c_k$, and $Ta\_a_{k+1}$ and $FR\_a_{k+1}$ are equal to the second predicted actual axle torque and the second predicted actual fuel consumption rate, respectively, when generated based on the second set of possible command values for $Te\_c_k$ and $Rat\_c_k$.

13. The motor vehicle propulsion control system of claim 8, wherein the cost module is further configured to determine the first and second costs with the following cost equation:

$$\begin{aligned}\text{Cost} = &\lambda_a*(Ta\_a_k-Ta\_r)^2 + \lambda_a*(Ta\_a_{k+1}-Ta\_r)^2 + \lambda_a* \\ & (Ta\_a_{k+2}-Ta\_r)^2 + \lambda_f*(FR\_a_k-FR\_r)^2 + \lambda_f* \\ & (FR\_a_{k+1}-FR\_r)^2 + \lambda_f*(FR\_a_{k+2}-FR\_r)^2 + \lambda_e* \\ & (Te\_c_k-Te\_r)^2 + \lambda_e*(Te\_c_{k+1}-Te\_r)^2 + \lambda_r*(Rat\_c_k- \\ & Rat\_r)^2 + \lambda_r*(Rat\_c_{k+1}-Rat\_r)^2 + \lambda_{\Delta r}*(\Delta Rat\_c_k)^2 + \\ & \lambda_{\Delta r}*(\Delta Rat\_c_{k+1})^2 \lambda_{\Delta e}*(\Delta Te\_c_k)^2 + \lambda_{\Delta e}* \\ & (\Delta Te\_c_{k+1})^2\end{aligned}$$

where
$\lambda_a$=the first predetermined weighting value;
$Ta\_a_k$=predicted actual axle torque at a prediction step k;
Ta_r=axle torque requested;
$Ta\_a_{k+1}$=predicted actual axle torque at a prediction step k+1;
$Ta\_a_{k+2}$=predicted actual axle torque at a prediction step k+2;
$\lambda_f$=the second predetermined weighting value;
$FR\_a_k$=predicted actual fuel consumption rate at the prediction step k;
FR_r=fuel consumption rate requested;
$FR\_a_{k+1}$=predicted actual fuel consumption rate at the prediction step k+1;
$FR\_a_{k+2}$=predicted actual fuel consumption rate at the prediction step k+2;
$\lambda_e$=a third predetermined weighting value;
$Te\_c_k$=engine output torque commanded at the prediction step k;
Te_r=engine output torque requested;
$Te\_c_{k+1}$=engine output torque commanded at the prediction step k+1;
$\lambda_r$=a fourth predetermined weighting value;
$Rat\_c_k$=transmission ratio commanded at the prediction step k;
Rat_r=transmission ratio requested;
$Rat\_c_{k+1}$=transmission ratio commanded at the prediction step k+1;
$\lambda_{\Delta r}$=a fifth predetermined weighting value;
$\Delta Rat\_c_k$=change in transmission ratio commanded at the prediction step k;
$\Delta Rat\_c_{k+1}$=change in transmission ratio commanded at the prediction step k+1;
$\lambda_{\Delta e}$=a sixth predetermined weighting value;
$\Delta Te\_c_k$=change in engine output torque commanded at the prediction step k; and
$\Delta Te\_c_{k+1}$=change in engine output torque commanded at the prediction step k+1,
   wherein $Ta\_a_{k+1}$ and $FR\_a_{k+1}$ are equal to the first predicted actual axle torque and the first predicted actual fuel consumption rate, respectively, when generated based on the first set of possible command values for $Te\_c_k$ and $Rat\_c_k$, and $Ta\_a_{k+1}$ and $FR\_a_{k+1}$ are equal to the second predicted actual axle torque and the second predicted actual fuel consumption rate, respectively, when generated based on the second set of possible command values for $Te\_c_k$ and $Rat\_c_k$.

14. The motor vehicle propulsion control system of claim 13, wherein the prediction module is further configured to determine the first and second predicted actual axle torques and the first and second predicted actual fuel consumption rates with the following set of equations:

$$x_{k+1} = A*x_k + B*\begin{bmatrix} Te\_c_k \\ Rat\_c_k \end{bmatrix} + K_{KF}*\left(\begin{bmatrix} Te\_a_k \\ FR\_a_k \\ Rat\_a_k \\ Ta\_a_k \end{bmatrix} - \begin{bmatrix} Te\_m_k \\ FR\_m_k \\ Rat\_m_k \\ Ta\_m_k \end{bmatrix}\right)$$

$$\begin{bmatrix} Ta\_a_{k+1} \\ FR\_a_{k+1} \end{bmatrix} = C*x_{k+1}$$

where
$x_{k+1}$=state variable at the prediction step k+1;
$x_k$=state variable at the prediction step k;
A=a first state matrix;
B=a second state matrix;
$K_{KF}$=a Kalman filter gain;
$Te\_a_k$=predicted actual engine output torque at the prediction step k;
$Rat\_a_k$=predicted actual transmission ratio at the prediction step k;
$Te\_m_k$=measured engine output torque at the prediction step k;
$FR\_m_k$=measured fuel consumption rate at the prediction step k;
$Rat\_m_k$=measured transmission ratio at the prediction step k;
$Ta\_m_k$=measured axle torque at the prediction step k; and
C=a third state matrix.

15. The motor vehicle propulsion control system of claim 14, wherein:

$Te_{min} < Te\_c_k < Te_{max}$;

$Te_{min} < Te\_c_{k+1} < Te_{max}$;

$Rat_{min} < Rat\_c_k < Rat_{max}$;

$Rat_{min} < Rat\_c_{k+1} < Rat_{max}$;

$\Delta Te\_c_k < \Delta Te\_c_{max}$;

$\Delta Te\_c_{k+1} < \Delta Te\_c_{max}$;

$\Delta Rat\_c_k < \Delta Rat\_c_{max}$; and $\Delta Rat\_c_{k+1} < \Delta Rat\_c_{max}$, where
$Te_{min}$=a minimum possible engine output torque;
$Te_{max}$=a maximum possible engine output torque;
$Rat_{min}$=a minimum possible transmission ratio;
$Rat_{max}$=a maximum possible transmission ratio;
$\Delta Te\_c_{max}$=a maximum possible change in engine output torque; and
$\Delta Rat\_c_{max}$=a maximum possible change in transmission ratio.

16. A propulsion system for a motor vehicle, comprising:
an engine operable to power the motor vehicle, the engine having an engine output shaft configured to transfer engine output torque;
a continuously variable transmission having a variator assembly including a first pulley and a second pulley, the first and second pulleys being rotatably coupled by a rotatable member, at least one of the first and second pulleys including a movable sheave translatable along an axis to selectively change a gear ratio between the engine output shaft and a transmission output shaft;
a drive axle configured to be driven via the transmission output shaft, the drive axle being configured to output axle torque to a set of wheels; and
a control system comprising:
a prediction module configured to generate a first predicted actual axle torque and a first predicted actual fuel consumption rate based on a first set of possible command values, the first set of possible command values including a first commanded engine output torque and a first commanded transmission ratio, the prediction module being further configured to generate a second predicted actual axle torque and a second predicted actual fuel consumption rate based on a second set of possible command values, the second set of possible command values including a second commanded engine output torque and a second commanded transmission ratio;
a cost module configured to:
determine a first cost for the first set of possible command values based on a first predetermined weighting value, a second predetermined weighting value, the first predicted actual axle torque, the first predicted actual fuel consumption rate, an axle torque requested, an engine output torque requested, a transmission ratio requested, and a fuel consumption rate requested; and
determine a second cost for the second set of possible command values based on the first predetermined weighting value, the second predetermined weighting value, the second predicted actual axle torque, the second predicted actual fuel consumption rate, the axle torque requested, the engine output torque requested, the transmission ratio requested, and the fuel consumption rate requested; and
a selection module configured to select one of the first and second sets of possible command values based on the lower of the first and second costs and set desired command values based on the possible command values of the selected one of the first and second sets.

17. The propulsion system of claim 16, wherein the prediction module is further configured to determine the first and second predicted actual axle torques and the first and second predicted actual fuel consumption rates with the following set of equations:

$$x_{k+1} = A*x_k + B*\begin{bmatrix} Te\_c_k \\ Rat\_c_k \end{bmatrix} + K_{KF}*\left(\begin{bmatrix} Te\_a_k \\ FR\_a_k \\ Rat\_a_k \\ Ta\_a_k \end{bmatrix} - \begin{bmatrix} Te\_m_k \\ FR\_m_k \\ Rat\_m_k \\ Ta\_m_k \end{bmatrix}\right)$$

-continued $$\begin{bmatrix} Ta\_a_{k+1} \\ FR\_a_{k+1} \end{bmatrix} = C * x_{k+1}$$

where $x_{k+1}$=state variable at a prediction step k+1;
$\lambda_k$=state variable at a prediction step k;
A=a first state matrix;
B=a second state matrix;
$Te\_c_k$=engine output torque commanded at the prediction step k;
$Rat\_c_k$=transmission ratio commanded at the prediction step k;
$K_{KF}$=a Kalman filter gain;
$Te\_a_k$=predicted actual engine output torque at the prediction step k;
$FR\_a_k$=predicted actual fuel consumption rate at the prediction step k;
$Rat\_a_k$=predicted actual transmission ratio at the prediction step k;
$Ta\_a_k$=predicted actual axle torque at the prediction step k;
$Te\_m_k$=measured engine output torque at the prediction step k;
$FR\_m_k$=measured fuel consumption rate at the prediction step k;
$Rat\_m_k$=measured transmission ratio at the prediction step k;
$Ta\_m_k$=measured axle torque at the prediction step k;
$Ta\_a_{k+1}$=predicted actual axle torque at the prediction step k+1;
$FR\_a_{k+1}$=predicted actual fuel consumption rate at the prediction step k+1; and
C=a third state matrix,
wherein $Ta\_a_{k+1}$ and $FR\_a_{k+1}$ are equal to the first predicted actual axle torque and the first predicted actual fuel consumption rate, respectively, when generated based on the first set of possible command values for $Te\_c_k$ and $Rat\_c_k$, and $Ta\_a_{k+1}$ and $FR\_a_{k+1}$ are equal to the second predicted actual axle torque and the second predicted actual fuel consumption rate, respectively, when generated based on the second set of possible command values for $Te\_c_k$ and $Rat\_c_k$.

18. The propulsion system of claim 17, wherein the cost module is configured to determine the first and second costs with the following cost equation:

$$\text{Cost} = \sum (y(i|k) - y_{ref})^T Q_Y (y(i|k) - y_{ref}) + (u(i|k) - u_{ref})^T Q_U (u(i|k) - u_{ref}) + \Delta u(i|k)^T Q_{\Delta u} \Delta u(i|k)$$

$$y = \begin{bmatrix} Te\_a \\ FR\_a \\ Rat\_a \\ Ta\_a \end{bmatrix}$$

$$y_{ref} = \begin{bmatrix} Te\_r \\ FR\_r \\ Rat\_r \\ Ta\_r \end{bmatrix}$$

$$u = \begin{bmatrix} Te\_c \\ Rat\_c \end{bmatrix}$$

$$u_{ref} = \begin{bmatrix} Te\_r \\ Rat\_r \end{bmatrix}$$

where

Te_a=predicted actual engine output torque;
FR_a=predicted actual fuel consumption rate;
Rat_a=predicted actual transmission ratio;
Ta_a=predicted actual axle torque;
Te_r=engine output torque requested;
FR_r=fuel consumption rate requested;
Rat_r=transmission ratio requested;
Ta_r=axle torque requested;
Te_c=commanded engine output torque;
Rat_c=commanded transmission ratio;
$Q_y$=the first predetermined weighting value;
$Q_u$=the second predetermined weighting value;
$Q_{\Delta u}$=a third predetermined weighting value;
i=index value;
k=prediction step; and
T=transposed vector.

19. The propulsion system of claim 17, wherein the cost module is further configured to determine the first and second costs with the following cost equation:

$$\text{Cost} = \lambda_a^*(Ta\_a_k - Ta\_r)^2 + \lambda_a^*(Ta\_a_{k+1} - Ta\_r)^2 + \lambda_a^* (Ta\_a_{k+2} - Ta\_r)^2 + \lambda_f^*(FR\_a_k - FR\_r)^2 + \lambda_f^*( FR\_a_{k+1} - FR\_r)^2 + \lambda_f^*(FR\_a_{k+2} - FR\_r)^2 + \lambda_e^* (Te\_c_k - Te\_r)^2 + \lambda_e^*(Te\_c_{k+1} - Te\_r)^2 + \lambda_r^*(Rat\_c_k - Rat\_r)^2 + \lambda_r^*(Rat\_c_{k+1} - Rat\_r)^2 + \lambda_{\Delta r}^*(\Delta Rat\_c_k)^2 + \lambda_{\Delta r}^*(\Delta Rat\_c_{k+1})^2 \lambda_{\Delta e}^*(\Delta Te\_c_k)^2 + \lambda_{\Delta e}^* (\Delta Te\_c_{k+1})^2$$

where $\lambda_a$=the first predetermined weighting value;
Ta_r=axle torque requested;
$Ta\_a_{k+2}$=predicted actual axle torque at a prediction step k+2;
$\lambda_f$=the second predetermined weighting value;
FR_r=fuel consumption rate requested;
$FR\_a_{k+2}$=predicted actual fuel consumption rate at the prediction step k+2;
$\lambda_e$=a third predetermined weighting value;
Te_r=engine output torque requested;
$Te\_c_{k+1}$=engine output torque commanded at the prediction step k+1;
$\lambda_r$=a fourth predetermined weighting value;
Rat_r=transmission ratio requested;
$Rat\_c_{k+1}$=transmission ratio commanded at the prediction step k+1;
$\lambda_{\Delta r}$=a fifth predetermined weighting value;
$\Delta Rat\_c_k$=change in transmission ratio commanded at the prediction step k;
$\Delta Rat\_c_{k+1}$=change in transmission ratio commanded at the prediction step k+1;
$\lambda_{\Delta e}$=a sixth predetermined weighting value;
$\Delta Te\_c_k$=change in engine output torque commanded at the prediction step k; and
$\Delta Te\_c_{k+1}$=change in engine output torque commanded at the prediction step k+1.

20. The propulsion system of claim 19, the control system further comprising a steady state optimizer module configured to:
determine an accelerator pedal position (PP);
determine an engine speed (RPM);
determine a vehicle speed (V);
determine an air-fuel ratio (AF);

determine the axle torque requested (Ta_r) based on the accelerator pedal position (PP) and the vehicle speed (V);

determine the fuel consumption rate requested (FR_r) based on the axle torque requested (Ta_r), the vehicle speed (V), the engine speed (RPM), and the air-fuel ratio (AF);

determine the transmission ratio requested (Rat_r) based on the axle torque requested (Ta_r) and the vehicle speed (V); and determine the engine output torque requested (Te_r) based on the axle torque requested (Ta_r), the transmission ratio requested (Rat_r), and a final drive ratio (FD).

* * * * *